United States Patent
Marovets

(10) Patent No.: US 10,354,258 B2
(45) Date of Patent: *Jul. 16, 2019

(54) SYSTEM, METHOD, AND APPARATUS FOR INTEGRATING REAL WORLD AND VIRTUAL WORLD ADVERTISING AND MARKETING, WHICH INCLUDES A COUPON EXCHANGE OPTION

(76) Inventor: Jack L. Marovets, Cedar Rapids, IA (US)

(*) Notice: Subject to any disclaimer, the term of this patent is extended or adjusted under 35 U.S.C. 154(b) by 126 days.

This patent is subject to a terminal disclaimer.

(21) Appl. No.: 13/573,306

(22) Filed: Sep. 7, 2012

(65) Prior Publication Data

US 2013/0066717 A1 Mar. 14, 2013

Related U.S. Application Data

(60) Provisional application No. 61/573,547, filed on Sep. 8, 2011.

(51) Int. Cl.
*G06Q 30/02* (2012.01)
(52) U.S. Cl.
CPC .................... *G06Q 30/02* (2013.01)
(58) Field of Classification Search
USPC ....................................................... 705/14.73
See application file for complete search history.

(56) References Cited

U.S. PATENT DOCUMENTS

| | | | | |
|---|---|---|---|---|
| 5,907,830 A * | 5/1999 | Engel et al. | | 705/14.26 |
| 6,898,571 B1 * | 5/2005 | Val | | G06Q 30/02 705/14.39 |
| 2004/0006487 A1 * | 1/2004 | Tari | | G06Q 20/209 705/24 |
| 2004/0122733 A1 * | 6/2004 | Hanschen | | G06Q 30/02 705/14.23 |
| 2005/0096988 A1 * | 5/2005 | Yanagisawa | | G06Q 20/20 705/16 |
| 2006/0217953 A1 * | 9/2006 | Parikh | | 704/1 |
| 2006/0224682 A1 * | 10/2006 | Inmon | | 709/206 |
| 2008/0093274 A1 * | 4/2008 | Stemmle | | B07C 3/00 209/584 |
| 2008/0162627 A1 * | 7/2008 | Sylvain | | 709/203 |
| 2008/0212759 A1 * | 9/2008 | Bates | | 379/207.15 |
| 2008/0232562 A1 * | 9/2008 | Suzuki | | 379/93.01 |
| 2009/0156229 A1 * | 6/2009 | Hein et al. | | 455/456.1 |
| 2009/0216748 A1 * | 8/2009 | Kravcik | | 707/5 |
| 2009/0259547 A1 * | 10/2009 | Clopp | | 705/14.16 |
| 2009/0276305 A1 * | 11/2009 | Clopp | | 705/14.16 |
| 2010/0202603 A1 * | 8/2010 | Pickering | | 379/201.02 |

(Continued)

FOREIGN PATENT DOCUMENTS

WO WO2008/015373 * 2/2008 ............... 379/201.2

*Primary Examiner* — Leland Marcus
(74) *Attorney, Agent, or Firm* — Goodhue, Coleman & Owens, P.C.

(57) ABSTRACT

The present invention relates to the use of Free Delivery to create a new system, method, and apparatus for delivering uniquely identified hard copy advertising and marketing materials to a consumer, which includes a system, method, and apparatus for Coupon Exchange, in which the coupon may be a hard copy or soft copy, which includes a uniquely identified bar code or other uniquely identified machine readable code, or which may be configured as a structured or semi-structured electronic message.

7 Claims, 1 Drawing Sheet

(56) References Cited

U.S. PATENT DOCUMENTS

| | | | |
|---|---|---|---|
| 2011/0173238 A1* | 7/2011 | Griggs | 707/805 |
| 2011/0238473 A1* | 9/2011 | Sankolli | G06Q 20/32 705/14.23 |
| 2011/0282729 A1* | 11/2011 | Gnanasambandam | G06Q 30/0238 705/14.38 |
| 2012/0084154 A1* | 4/2012 | Dresner | G06Q 20/10 705/14.66 |

* cited by examiner

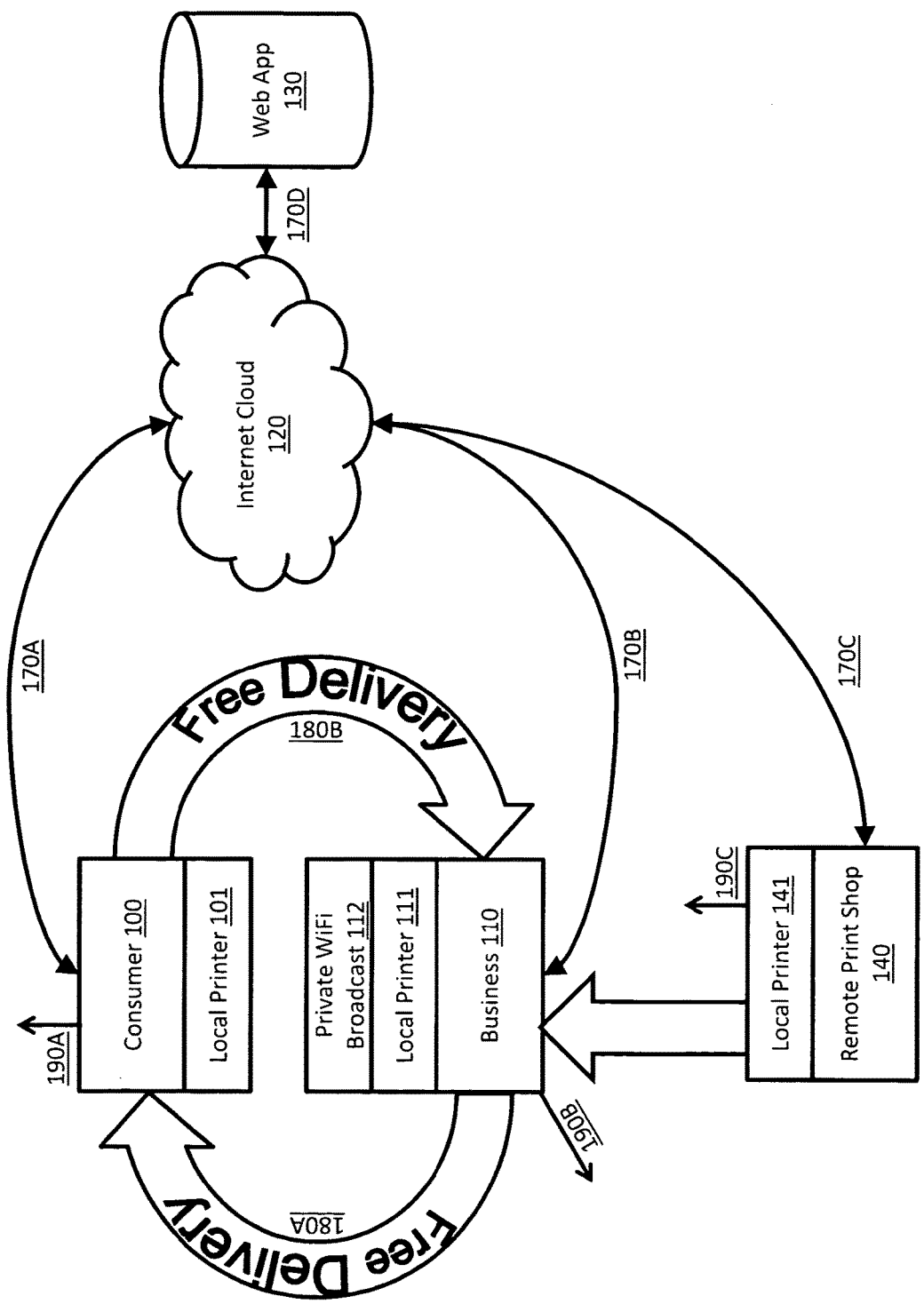

SYSTEM, METHOD, AND APPARATUS FOR INTEGRATING REAL WORLD AND VIRTUAL WORLD ADVERTISING AND MARKETING, WHICH INCLUDES A COUPON EXCHANGE OPTION

CROSS-REFERENCE TO RELATED APPLICATIONS

This application claims priority to and is a conversion of: U.S. Provisional Patent Application Ser. No. 61/573,547 filed Sep. 08, 2011, to Jack Marovets, entitled System, Method, And Apparatus For Integrating Real World And Virtual World Advertising And Marketing Including Coupon Exchange, which is herein incorporated by reference.

FIELD OF THE INVENTION

The present invention relates to the use of Free Delivery to create a new system, method, and apparatus for delivering uniquely identified hard copy advertising and marketing materials to a consumer, which includes a system, method, and apparatus for Coupon Exchange.

PRIOR ART

There are dozens of methods of advertising products, including, cross-branding, ambush marketing, article marketing, article video marketing, digital market, direct marketing, diversity marketing, mega-marketing, multi-level marketing, cause marketing, close range marketing, cloud marketing, communal marketing, consumer-generated marketing, cross-media marketing, customer advocacy marketing, database marketing, ethical marketing, evangelism marketing, figure of merit marketing, global marketing, guerrilla marketing, inbound marketing, influencer marketing, Internet marketing, nano-campaign marketing, next best action marketing, permission marketing, proximity marketing, reality marketing, relationship marketing, shopper marketing, undercover marketing, loyalty marketing, etc. There are no real world marketing and advertising methods that are agile, can employ virtually any marketing and advertising method, uses on-demand printing, and existing methods of Free Delivery of real world objects as a means of Free Delivery of advertising and marketing materials to a consumer that includes a Coupon Exchange, in which the coupon may be hard copy or soft copy, which includes a uniquely identified bar code or other uniquely identified machine readable code, or which may be configured as a structured or semi-structured electronic message.

OBJECTS AND FEATURES OF THE INVENTION

It is an object of the present invention to provide a system, method, and apparatus for a marketing system including Coupon Exchange, in which the coupon may be hard copy or soft copy, which includes a uniquely identified bar code or other uniquely identified machine readable code, or which may be configured as a structured or semi-structured electronic message, that links the real and virtual world.

It is a further object of the present invention to provide a hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery.

It is a further object of the present invention to provide a hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote cross-branding.

It is a further object of the present invention to provide a hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote ambush marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote article marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote article video marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote digital marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote direct marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote diversity marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote mega-marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote multi-level marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote cause marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote close range marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote cloud marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote communal marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote consumer-generated marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote cross-media marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote customer advocacy marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote database marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote ethical marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote evangelism marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote figure of merit marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote global marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote guerrilla marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote inbound marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote influencer marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote Internet marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote nano-campaign marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote next best action marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote permission marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote proximity marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote reality marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote relationship marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote shopper marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote undercover marketing.

It is a further object of the present invention to provide hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery to promote loyalty marketing.

It is an even further object of the present invention to provide on-demand printing by a business for use in conjunction with real world Free Delivery, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a marketing system including Coupon Exchange, in which the coupon may be hard copy or soft copy, which includes a uniquely identified bar code or other uniquely identified machine readable code, or which may be configured as a structured or semi-structured electronic message, that can be used by a business to fill in the peaks and valleys of customer flow into a brick-and-mortar facility, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide at least one Wi-Fi broadcast channel for the purpose of delivering local advertising and marketing information to a Wi-Fi enabled device, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a web-based interface that allows a customer to choose the basic color of a web-site in order for advertisers and marketers to make inferences into a customer's personality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide bar codes as a means of exchanging data to enabled scanning devices, and to launch web-based applications, and mobile applications to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use RFID as a means of exchanging data to enabled scanning devices, and to launch web-based applications to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use virtual RFID tags as a means of exchanging data to enabled scanning devices, and to launch web-based applications to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use mobile bar codes on video displays as a means of exchanging data to enabled scanning devices, and to launch web-based applications to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use EPCglobal bar codes and/or RFID, and/or virtual RFID as a means of exchanging data to enabled scanning devices, to launch web-based applications to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use HTML5 as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use extensible mark-up language (XML) as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use cascading style sheets (CSS) as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use short codes as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide web-based applications for consumers, businesses, advertisers, and marketers as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide mobile applications to access web-based applications for consumers, businesses, advertisers, and marketers as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use short messaging services (SMS) as a means to provide functionality.

It is an even further object of the present invention to use multimedia messaging services (MMS) as a means to provide functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Google Android OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Nokia Symbian OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Apple iOS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Rim Blackberry OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Microsoft Windows Phone OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Samsung Bada OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Nokia Maemo OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to use the Nokia Meego OS as a means to provided functionality, including use for Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of a delivery pizza boxes that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of any type box that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of any type can that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of any type bottle that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of disposable coffee cups that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials on any surface of disposable coffee cup wrappers that can be optionally linked to a web-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by United Parcel Service (UPS) of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by FedEx of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by United States Postal Service (USPS) of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by taxi drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by bus drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by Girl Scouts delivering Girl Scout Cookie orders of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery of hard copy advertising and marketing materials pre-printed and/or printed on demand on the front and/or back of store receipts that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by school bus drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by taxi drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by repairmen of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by flower delivery drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by couriers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by laundry delivery drivers of hard copy advertising and marketing materials that can optionally be linked to a web-based application via any type of Internet connection, including a mobile-based application enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by newspaper delivery persons of hard copy advertising and marketing materials in a newspaper, or separately from a newspaper, that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by Schwan's delivery drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by furniture delivery drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by carpet cleaner drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by ice cream truck drivers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by utility meter readers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by parking meter readers of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by garbage collection personnel of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by home marketing persons, such as people that sell Mary Kay and Amway, of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by oil change stores of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by mechanics of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by automobile dealers of hard copy advertising and marketing materials at the time of delivery of an automobile, or the service of an automobile, that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by a book retailer of hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by shoe retailers of hard copy advertising and marketing materials on shoe boxes that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by shoe retailers of hard copy advertising and marketing materials not on shoe boxes that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by clothing manufacturers of hard copy advertising and marketing materials on clothing labels that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by churches of hard copy advertising and marketing materials on bulletins that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by churches of hard copy advertising and marketing materials inserted in bulletins that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by businesses of hard copy advertising and marketing materials on bills sent in the mail that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by businesses of hard copy advertising and marketing materials inserted in bills sent in the mail that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by businesses of hard copy advertising and marketing materials on bills sent in the mail that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by businesses of hard copy advertising and marketing materials inserted into magazines sent in the mail that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by businesses of hard copy advertising and marketing materials on magazines sent in the mail that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by states of hard copy advertising and marketing materials on lottery tickets that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by hotels of hard copy advertising and marketing materials on room keys that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by persons of hard copy advertising and marketing materials on business cards that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by companies that produce printer paper of hard copy advertising and marketing materials on printer paper that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by drivers in vehicles equipped with programmable, changeable rear window display device for advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery by the consumer by driving to places of business, such as, but not limited to, concerts, sporting events, stores, hotels, restaurants, bowling alleys, etc, in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by an airline in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a railroad in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a car rental agency in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a hotel in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a restaurants in order to receive hard copy advertising and marketing materials on menus that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by restaurants in order to receive hard copy advertising and marketing materials on table tops that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by restaurants in order to receive hard copy advertising and marketing materials on electronic table tops that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a restaurants in order to receive hard copy advertising and marketing materials in a publication placed at a table that is not a menu that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by an restaurants in order to receive hard copy advertising and marketing materials in a publication placed at a table that is not a menu that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a grocery store in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a doctor's office in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a visiting nurse in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a movie rental store in order to receive hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a beer company on beer bottles to provide fantasy league sports tokens in the form of advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide Free Delivery to a consumer by a beer company on beer bottles cooperating with pizza delivery companies on pizza delivery boxes to provide fantasy league sports tokens in the form of advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide language specific hard copy and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a web-based application that allows for an advertiser to enter into a reverse auction for print on-demand advertising space on hard copy and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a web-based application that allows for a consumer to enter into a reverse auction to receive offers for print on-demand space on hard copy advertising and marketing materials that can optionally be linked to a web-based application via any type of Internet connection, including a mobile-based application to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to use location based service technologies as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to create a domain and sub-domains as a sub-web to specifically control access and information linked to hard copy advertising and marketing materials as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to create a domain and sub-domains as a sub-web to specifically control access through the use of telephone numbers as the primary means of accessing information linked to hard copy advertising and marketing materials as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to integrate the Facebook social network as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to integrate the Twitter social network as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to integrate the YouTube social network as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to integrate the LinkedIn social network as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a web-based application that can be customized by an advertiser or marketer using programmable, customized filters as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an even further object of the present invention to provide a web-based application, and corresponding mobile-based application that can be customized by a consumer using programmable, customized filters as a means to provide functionality to enable Coupon Exchange, in which the coupon may be hard copy or soft copy, which includes a uniquely identified bar code or other uniquely identified machine readable code, or which may be configured as a structured or semi-structured electronic message.

It is an object of the present invention to use Markup Language tags and/or data structure encoded in text messages to provide a system, method, and apparatus for a marketing system including Coupon Exchange, in which the coupon may be hard copy or soft copy, which includes a uniquely identified bar code or other uniquely identified machine readable code, or which may be configured as a structured or semi-structured electronic message, that links the real and virtual world.

It is a further object of the present invention to use Markup Language tags and/or structured or semi-structured data, which may use structures such as comma delimited values and/or partitions, encoded in text messages to provide a hybrid real and virtual world marketing system including Coupon Exchange, in which the coupon may be hard copy or soft copy, which includes a uniquely identified bar code or other uniquely identified machine readable code, or which may be configured as a structured or semi-structured electronic message, that uses real world Free Delivery.

It is an even further object of the present invention to use and XML schema known as AdsML Markup Language, which is used for interchange of data between advertising systems.

It is an even further object of the present invention to use and XML schema known as Agricultural Ontology Service.

It is an even further object of the present invention to use and XML schema known as AIML Markup Language, which is used for creating artificial intelligence chatterbots.

It is an even further object of the present invention to use and XML schema known as Attention Profiling Markup Language (APML), which is a format for capturing a person's interests and dislikes.

It is an even further object of the present invention to use and XML schema known as Atom, which is a language used for web feeds.

It is an even further object of the present invention to use and XML schema known as Automated Test Markup Language (ATML), which defines a standard exchange medium for sharing data between components of automatic test systems.

It is an even further object of the present invention to use and XML schema known as Attention.xml.

It is an even further object of the present invention to use and XML schema known as aecXML, which is a Markup Language which uses Industry Foundation Classes to create a vendor-neutral means to access data generated by Building data Modeling.

It is an even further object of the present invention to use and XML schema known as Binary Format Description Language, which is an extension of XSIL which has added conditionals and the ability to reference files by their stream numbers, rather than by their public URLs.

It is an even further object of the present invention to use and XML schema known as Business Process Execution Language, which is a business process modeling language that is executable.

It is an even further object of the present invention to use and XML schema known as Basic Markup Language, which is an easy to use Markup Language.

It is an even further object of the present invention to use and XML schema known as Call Control eXtensible Markup Language, which is a standard designed to provide telephony support to VoiceXML.

It is an even further object of the present invention to use and XML schema known as CellML, which is a language describing mathematical models.

It is an even further object of the present invention to use and XML schema known as Channel Definition Format.

It is an even further object of the present invention to use and XML schema known as Chemical Markup Language.

It is an even further object of the present invention to use and XML schema known as Clinical Data Interchange Standards Consortium.

It is an even further object of the present invention to use and XML schema known as Clinical Document Architecture.

It is an even further object of the present invention to use and XML schema known as CMRL, which is a Markup Language for concise message content.

It is an even further object of the present invention to use and XML schema known as COLLADA, which is standard for exchanging digital assets among various graphics software applications.

It is an even further object of the present invention to use and XML schema known as Common Alerting Protocol (CAP).

It is an even further object of the present invention to use and XML schema known as CookSwing.

It is an even further object of the present invention to use and XML schema known as CXML, which is a protocol intended for communication of business documents between procurement applications, e-commerce hubs and suppliers.

It is an even further object of the present invention to use and XML schema known as Darwin data Typing Architecture.

It is an even further object of the present invention to use and XML schema known as Diag-ML for Integrated Diagnostics and Health Management.

It is an even further object of the present invention to use and XML schema known as dicML for monolingual and bilingual dictionaries.

It is an even further object of the present invention to use and XML schema known as Digital Forensics XML.

It is an even further object of the present invention to use and XML schema known as Dimensional Markup Language.

It is an even further object of the present invention to use and XML schema known as Directory Service Markup Language.

It is an even further object of the present invention to use and XML schema known as DisplayML.

It is an even further object of the present invention to use and XML schema known as DocBook: a Markup Language for technical documentation.

It is an even further object of the present invention to use and XML schema known as Document Schema Definition Language.

It is an even further object of the present invention to use and XML schema known as Document Structure Description, which is a schema language for XML.

It is an even further object of the present invention to use and XML schema known as DotML.

It is an even further object of the present invention to use and XML schema known as ebXML, which is a collection of Electronic Business specifications.

It is an even further object of the present invention to use and XML schema known as It is an even further object of the present invention to use and XML schema known as eLML, which is an eLesson Markup Language.

It is an even further object of the present invention to use and XML schema known as EMML Enterprise Mashup Markup Language.

It is an even further object of the present invention to use and XML schema known as ENML (eNotarization Markup Language).

It is an even further object of the present invention to use and XML schema known as EPPML (Extensible Postal Product Model and Language).

It is an even further object of the present invention to use and XML schema known as EPUB (electronic publication, open e-book format).

It is an even further object of the present invention to use and XML schema known as Extensible Application Markup Language.

It is an even further object of the present invention to use and XML schema known as Extensible Data Format.

It is an even further object of the present invention to use and XML schema known as Extensible Messaging and Presence Protocol.

It is an even further object of the present invention to use and XML schema known as Extensible Provisioning Protocol.

It is an even further object of the present invention to use and XML schema known as Extensible Resource Identifier.

It is an even further object of the present invention to use and XML schema known as Extensible Stylesheet Language.

It is an even further object of the present invention to use and XML schema known as FDCML (Field Device Configuration Markup Language).

It is an even further object of the present invention to use and XML schema known as FicML (Fiction Markup Language).

It is an even further object of the present invention to use and XML schema known as FictionBook, which is an e-book format.

It is an even further object of the present invention to use and XML schema known as FieldML (Field Modelling/Markup Language).

It is an even further object of the present invention to use and XML schema known as FleXML, which is an XML transformation language.

It is an even further object of the present invention to use and XML schema known as FpML, which is a Financial Products Markup Language.

It is an even further object of the present invention to use and XML schema known as FreebXML.org, which is an initiative that aims to foster the development and adoption of ebXML and related technology through software and experience sharing.

It is an even further object of the present invention to use and XML schema known as FXT, which is a transformation specification for the Functional XML Transformation Tool.

It is an even further object of the present invention to use and XML schema known as Geography Markup Language, which is a grammar defined by the Open Geospatial Consortium (OGC) to express geographical features.

It is an even further object of the present invention to use and XML schema known as GJXDM, which is a data reference model for the exchange of data within the justice and public safety communities.

It is an even further object of the present invention to use and XML schema known as GPX, which is a language designed for transferring GPS data between software applications.

It is an even further object of the present invention to use and XML schema known as GraphML, which is a standard exchange format for graphs.

It is an even further object of the present invention to use and XML schema known as GuideML.

It is an even further object of the present invention to use and XML schema known as GXA, which is an extension of SOAP being worked on by Microsoft, IBM and some other developers.

It is an even further object of the present invention to use and XML schema known as GXL, which is a standard exchange format for graphs.

It is an even further object of the present invention to use and XML schema known as Green Building XML, also known as "gbXML", which is a schema to facilitate the transfer of building properties stored in 3D building data models (BIM) to engineering analysis tools, especially energy and building performance analysis.

It is an even further object of the present invention to use and XML schema known as HelpML.

It is an even further object of the present invention to use and XML schema known as HumanML, which is used for describing contextual (emotional, social, pragmatic) data about instances of human communication.

It is an even further object of the present invention to use and XML schema known as data and Content Exchange.

It is an even further object of the present invention to use and XML schema known as Industry Foundation Classes, which is specifically the "ifcXML" format, defined by ISO 10303-28 ("STEP-XML"), having file extension ".ifcXML", which is suitable for interoperability with XML tools and exchanging partial building models.

It is an even further object of the present invention to use and XML schema known as Interactive Media Markup Language, also known as IMML, which is used to define 3D spaces in the VastPark 3D platform.

It is an even further object of the present invention to use and XML schema known as Java Speech Markup Language, which is a language for annotating text input to speech synthesizers.

It is an even further object of the present invention to use and XML schema known as Job Definition Format, which is a standard developed by the graphic arts industry to facilitate cross-vendor work-flow implementations.

It is an even further object of the present invention to use and XML schema known as Job Submission Description Language, which describes simple tasks to non-interactive computer execution systems.

It is an even further object of the present invention to use and XML schema known as Keyhole Markup Language, which is used for geographic annotation.

It is an even further object of the present invention to use and XML schema known as LandXML, which is a non-proprietary standard for data exchange among the land development, civil engineering and surveying communities.

It is an even further object of the present invention to use and XML schema known as Lenex, which is an exchange format for swim rankings.

It is an even further object of the present invention to use and XML schema known as LGML, which is a Linguistics Markup Language, which is for describing natural languages.

It is an even further object of the present invention to use and XML schema known as Link Contract.

It is an even further object of the present invention to use and XML schema known as LOGML, also known as Log Markup Language, which is used for describing the log reports of web servers.

It is an even further object of the present invention to use and XML schema known as Mail Markup Language (MML), which is a language describing and structuring content for email.

It is an even further object of the present invention to use and XML schema known as MathML, which is a language describing mathematical notation.

It is an even further object of the present invention to use and XML schema known as Medical Markup Language.

It is an even further object of the present invention to use and XML schema known as Medical Reality Markup Language (MRML).

It is an even further object of the present invention to use and XML schema known as Microformats, which is a piece mark up that allows expression of semantics in an HTML (or XHTML) web page.

It is an even further object of the present invention to use and XML schema known as MOWL, which describes semantic interactions with multimedia content.

It is an even further object of the present invention to use and XML schema known as Music Encoding Initiative (MEI), which is an XML-based language for digital representations of music notation documents.

It is an even further object of the present invention to use and XML schema known as Music Markup Language.

It is an even further object of the present invention to use and XML schema known as MusicXML, which is an XML-based music notation file format.

It is an even further object of the present invention to use and XML schema known as MXML, which is a language used to declaratively lay-out the interface of applications, and also to implement complex business logic and rich Internet application behaviors.

It is an even further object of the present invention to use and XML schema known as Namespace Routing Language.

It is an even further object of the present invention to use and XML schema known as Namespace-based Validation Dispatching Language.

It is an even further object of the present invention to use and XML schema known as National data Exchange Model.

It is an even further object of the present invention to use and XML schema known as Nested Context Language.

It is an even further object of the present invention to use and XML schema known as NeXML, which is an XML representation of the NeXus data format.

It is an even further object of the present invention to use and XML schema known as NeuroML, which is a computational neuroscience model.

It is an even further object of the present invention to use and XML schema known as ODD, also known as 'One Document Does-it-all' TEI format for simultaneously recording project documentation and meta-schema definition from which a person can generate RELAX NG, W3C XML Schema, and DTDs as well as formatted documentation.

It is an even further object of the present invention to use and XML schema known as ODRL, which is an XML-based standard Rights Expression Language (REL) used in Digital Rights Management systems.

It is an even further object of the present invention to use and XML schema known as Office Open XML, which is a Microsoft file format specification for the storage of electronic documents.

It is an even further object of the present invention to use and XML schema known as OFX, also known as Open Financial Exchange, which is a unified specification for the electronic exchange of financial data between financial institutions, businesses and consumers via the Internet.

It is an even further object of the present invention to use and XML schema known as OIOXML, which is an XML-Markup Language created by the Danish government to ease communication from, to and between Danish governmental instances.

It is an even further object of the present invention to use and XML schema known as Open Mathematical Documents (OMDoc), based on OpenMath and MathML, but with a greater coverage.

It is an even further object of the present invention to use and XML schema known as OML, which is an XML format for outlines, based on OPML.

It is an even further object of the present invention to use and XML schema known as Open eBook, which is the e-book format defined by Open eBook Publication Structure Specification; superseded by ePub.

It is an even further object of the present invention to use and XML schema known as Open Scripture data Standard (OSIS), which is an XML-markup schema that defines tags for marking up Bibles, theological commentaries, and other related literature.

It is an even further object of the present invention to use and XML schema known as OpenDocument, which is a document file format used for describing electronic documents.

It is an even further object of the present invention to use and XML schema known as OpenMath, which is a Markup Language for mathematical formulas which can complement MathML.

It is an even further object of the present invention to use and XML schema known as OPML, which is an XML format for outlines.

It is an even further object of the present invention to use and XML schema known as phyloXML, which is an XML for phylogenetic and phylogenomic applications.

It is an even further object of the present invention to use and XML schema known as PMML, which an XML Markup Language for predictive analytics and data mining.

It is an even further object of the present invention to use and XML schema known as PNML, which is also known as Petri Net Markup Language.

It is an even further object of the present invention to use and XML schema known as PDBML, which is an XML Markup Language for Protein Data Bank.

It is an even further object of the present invention to use and XML schema known as RailML, which is a Markup Language for interoperability in railway industry applications.

It is an even further object of the present invention to use and XML schema known as RAML, which is a vocabulary for describing relational algebra expressions.

It is an even further object of the present invention to use and XML schema known as RDFa.

It is an even further object of the present invention to use and XML schema known as RecipeML.

It is an even further object of the present invention to use and XML schema known as Regular Language.

It is an even further object of the present invention to use and XML schema known as RELAXNG.

It is an even further object of the present invention to use and XML schema known as Remote Telescope Markup Language.

It is an even further object of the present invention to use and XML schema known as Resource Description Framework (RDF), which is a meta-data model based upon the idea of making statements about resources.

It is an even further object of the present invention to use and XML schema known as RoadXML, which is a file format for driving simulator databases.

It is an even further object of the present invention to use and XML schema known as RSS.

It is an even further object of the present invention to use and XML schema known as RSS enclosure.

It is an even further object of the present invention to use and XML schema known as S5 file format, which describes slide-show data.

It is an even further object of the present invention to use and XML schema known as SAML, which is used for authentication and authorization data.

It is an even further object of the present invention to use and XML schema known as SBML, is used to describe models of biological processes.

It is an even further object of the present invention to use and XML schema known as Scalable Vector Graphics, which describes two-dimensional vector graphics.

It is an even further object of the present invention to use and XML schema known as Schematron, which is an XML structure validation language for making assertions about the presence or absence of patterns in trees.

It is an even further object of the present invention to use and XML schema known as SCORM, which is a Markup Language for web-based e-learning.

It is an even further object of the present invention to use and XML schema known as SCXML, which provides a generic state-machine based execution environment based on Harel state-charts It is an even further object of the present invention to use and XML schema known as Shopinfo.xml, which is used to provide shop and product data.

It is an even further object of the present invention to use and XML schema known as Simple Sharing Extensions.

It is an even further object of the present invention to use and XML schema known as SOAP, which is a protocol for exchanging XML-based messages over computer networks.

It is an even further object of the present invention to use and XML schema known as SOAP with Attachments, which describes the method of using Web Services to send and receive files using a combination of SOAP and MIME, primarily over HTTP.

It is an even further object of the present invention to use and XML schema known as Speech Application Language Tags.

It is an even further object of the present invention to use and XML schema known as Speech.

It is an even further object of the present invention to use and XML schema known as Synthesis Markup Language, which is a Markup Language for speech synthesis applications.

It is an even further object of the present invention to use and XML schema known as SPML, which provides a user, resource and service provisioning data.

It is an even further object of the present invention to use and XML schema known as StratML, which is an XML vocabulary and schema for strategic plans.

It is an even further object of the present invention to use and XML schema known as Streaming Transformations for XML, which is a XML transformation language intended as a high-speed, low memory consumption alternative to XSLT.

It is an even further object of the present invention to use and XML schema known as SXBL, which defines the presentation and interactive behavior of elements described in SVG.

It is an even further object of the present invention to use and XML schema known as Synchronized Multimedia Integration Language, which describes multimedia presentations.

It is an even further object of the present invention to use and XML schema known as Text Encoding Initiative, which describes guidelines for text encoding, with schemas and a mechanism to customize to individual project needs.

It is an even further object of the present invention to use and XML schema known as ThML, also known as Theological Markup Language, created by Christian Classics Ethereal Library (CCEL), to create electronic theological texts.

It is an even further object of the present invention to use and XML schema known as Topicmaps.

It is an even further object of the present invention to use and XML schema known as TransducerML, which is an Open Geospatial Consortium language for describing sensors and their output.

It is an even further object of the present invention to use and XML schema known as Translation Memory eXchange (TMX), which is describes translation memory data.

It is an even further object of the present invention to use and XML schema known as TREX, which is a simple schema language.

It is an even further object of the present invention to use and XML schema known as Twitter Markup Language (TML), which is a subset of RTML.

It is an even further object of the present invention to use and XML schema known as Universal Description Discovery and Integration (UDDI), which describes a registry for businesses worldwide to list themselves on the Internet.

It is an even further object of the present invention to use and XML schema known as Vector Markup Language, which is used to produce vector graphics, implemented in Microsoft Office 2000 and higher.

It is an even further object of the present invention to use and XML schema known as it is an even further object of the present invention to use and XML schema known as Vexi, which is an easy-to-use platform for the development and delivery of Internet application interfaces.

It is an even further object of the present invention to use and XML schema known as Video Ad Serving Template VAST, which is an IAB sponsored language for use in delivery of inline/linear and non-linear video advertising online.

It is an even further object of the present invention to use and XML schema known as VoiceXML, which describes a format for specifying interactive voice dialogues between a human and a computer.

It is an even further object of the present invention to use and XML schema known as W3C MMI.

It is an even further object of the present invention to use and XML schema known as WDDX, also known as Web Distributed Data eXchange.

It is an even further object of the present invention to use and XML schema known as Web Feed.

It is an even further object of the present invention to use and XML schema known as Web Ontology Language, which is a Markup Language for defining and instantiating Web ontologies (a set of concepts within a domain and the relationships between those concepts).

It is an even further object of the present invention to use and XML schema known as Web Services Flow Language, which is an XML language proposed by IBM to describe the composition of Web services, later superseded by BPEL.

It is an even further object of the present invention to use and XML schema known as Web Services Description Language, which is an XML-based language that provides a model for describing Web services.

It is an even further object of the present invention to use and XML schema known as Web Services Dynamic Discovery, which is a technical specification that defines a multicast discovery protocol to locate services on a local network.

It is an even further object of the present invention to use and XML schema known as Wellsite data Transfer Standard Markup Language.

It is an even further object of the present invention to use and XML schema known as WML, also known as Wireless Markup Language.

It is an even further object of the present invention to use and XML schema known as WiX, also known as Windows Installers Data.

It is an even further object of the present invention to use and XML schema known as WordprocessingML, which is a file format specification for the storage of electronic documents.

It is an even further object of the present invention to use and XML schema known as WS-Policy.

It is an even further object of the present invention to use and XML schema known as X3D, also known as Extensible 3D, which is an international standard for real-time 3D computer graphics, the successor to Virtual Reality Modeling Language (VRML).

It is an even further object of the present invention to use and XML schema known as XAML, which is a declarative XML-based vector graphics Markup Language.

It is an even further object of the present invention to use and XML schema known as XACML, also known as eXtensible Access Control Markup Language.

It is an even further object of the present invention to use and XML schema known as XAP, also known as, Antenna Patterns.

It is an even further object of the present invention to use and XML schema known as XBEL, which is also known as XML Bookmark Exchange Language.

It is an even further object of the present invention to use and XML schema known as XBL, which is used to declare the behavior and look of 'XUL'-widgets and XML elements.

It is an even further object of the present invention to use and XML schema known as XBRL, which is an open data standard for financial reporting.

It is an even further object of the present invention to use and XML schema known as xCBL, which is a collection of XML specifications for use in e-business.

It is an even further object of the present invention to use and XML schema known as xCal, which is the XML-compliant representation of the iCalendar standard.

It is an even further object of the present invention to use and XML schema known as XCES, which is an XML based standard to codify text corpus.

It is an even further object of the present invention to use and XML schema known as XDI, which is used for sharing, linking, and synchronizing data using machine-readable structured documents that use an RDF vocabulary based on XRI structured identifiers.

It is an even further object of the present invention to use and XML schema known as Xduce, which is an XML transformation language.

It is an even further object of the present invention to use and XML schema known as XDXF, which is used for monolingual and bilingual dictionaries.

It is an even further object of the present invention to use and XML schema known as XFA, which enhances the processing of web forms.

It is an even further object of the present invention to use and XML schema known as Xforms, which is a format for the specification of a data processing model for XML data and user interface(s) for the XML data, such as web forms.

It is an even further object of the present invention to use and XML schema known as XFT, which is a XML language used in travel industry.

It is an even further object of the present invention to use and XML schema known as XHTML, which is a Markup Language that has the same depth of expression as HTML, but with a syntax conforming to XML.

It is an even further object of the present invention to use and XML schema known as XHTML Basic.

It is an even further object of the present invention to use and XML schema known as XHTML Friends Network.

It is an even further object of the present invention to use and XML schema known as XHTML Modularization.

It is an even further object of the present invention to use and XML schema known as XidML, which is an open standard used within the flight test instrumentation industry that describes instrumentation and how data is acquired, stored, transmitted and processed.

It is an even further object of the present invention to use and XML schema known as Xinclude, which describes a processing model and syntax for general purpose XML inclusion.

It is an even further object of the present invention to use and XML schema known as XLIFF, which is a XML Localization Interchange File Format, a format created to standardize localization.

It is an even further object of the present invention to use and XML schema known as Xlink, which is a language used for creating hyperlinks in XML documents.

It is an even further object of the present invention to use and XML schema known as XMI, which is an OMG standard for exchanging meta-data data via XML, which is the most common use of XMI is as an interchange format for UML models.

It is an even further object of the present invention to use and XML schema known as XML Encryption, which is a specification that defines how to encrypt the content of an XML element.

It is an even further object of the present invention to use and XML schema known as XML data Set, which describes an abstract data model of an XML document in terms of a set of data items.

It is an even further object of the present invention to use and XML schema known as XML Interface for Network Services, which is the definition and implementation of Internet applications, enforcing a specification-oriented approach.

It is an even further object of the present invention to use and XML schema known as XML Resource, which provides a platform independent way of describing windows in a GUI.

It is an even further object of the present invention to use and XML schema known as XML Schema, which is a description of a type of XML document, typically expressed in terms of constraints on the structure and content of documents of that type, above and beyond the basic syntax constraints imposed by XML itself.

It is an even further object of the present invention to use and XML schema known as XML Script, which is a XML transformation language, or a Microsoft technology preview for scripting web browsers.

It is an even further object of the present invention to use and XML schema known as XML Signature, which is an XML syntax for digital signatures.

It is an even further object of the present invention to use and XML schema known as XML for Analysis, which is used to provide data access in analytical systems, such as OLAP and Data Mining.

It is an even further object of the present invention to use and XML schema known as XML pipeline: a language expressing how XML transformations are connected together.

It is an even further object of the present invention to use and XML schema known as XML-RPC, which is a remote procedure call protocol which uses XML to encode its calls and HTTP as a transport mechanism.

It is an even further object of the present invention to use and XML schema known as XMLmosaic, which is a programming language contained in XML code. The XML describes relationships between classes and contains the procedures.

It is an even further object of the present invention to use and XML schema known as XMLTerm, which is a Mozilla-based Semantic User Interface.

It is an even further object of the present invention to use and XML schema known as XMLTV, which is a format to represent TV listings.

It is an even further object of the present invention to use and XML schema known as XMLVM, which is a format used to convert java .class files and .NET .exe files into other languages such as JavaScript or Objective-C.

It is an even further object of the present invention to use and XML schema known as XOMGL, which is used to obtain large amounts of data from municipal government agencies.

It is an even further object of the present invention to use and XML schema known as XOXO, which is an XML microformat for publishing outlines, lists, and blogrolls on the Web.

It is an even further object of the present invention to use and XML schema known as XPDL, also known as Interchange Business Process, which describes definitions between different workflow products.

It is an even further object of the present invention to use and XML schema known as XPath (or XPath 1.0).

It is an even further object of the present invention to use and XML schema known as XPath 2.0, which is a language for addressing portions of XML documents, successor of XPath 1.0.

It is an even further object of the present invention to use and XML schema known as Xpointer, which is a language used for addressing components of XML based Internet media.

It is an even further object of the present invention to use and XML schema known as Xproc, which is a W3C standard language to describe XML Pipeline.

It is an even further object of the present invention to use and XML schema known as Xquery, which is a query language designed to query collections of XML data (similar to SQL).

It is an even further object of the present invention to use and XML schema known as XrML, also known as the eXtensible Rights Markup Language, or the Rights Expression Language (REL) for MPEG-21.

It is an even further object of the present invention to use and XML schema known as Xrules, which is a rules language that expresses constraints, calculations, inter-dependencies, and properties that describe and exist among elements and attributes of an XML document.

It is an even further object of the present invention to use and XML schema known as XSIL, which is an XML-based transport language for scientific data.

It is an even further object of the present invention to use and XML schema known as XSL Formatting Objects, which is a Markup Language for XML document formatting which is most often used to generate PDFs.

It is an even further object of the present invention to use and XML schema known as XSL Transformations, which is a language used for the transformation of XML documents.

It is an even further object of the present invention to use and XML schema known as XSPF, which describes a play-list format for digital media.

It is an even further object of the present invention to use and XML schema known as XUL, which is a XML user interface Markup Language developed by the Mozilla project.

It is an even further object of the present invention to use and XML schema known as Xupdate, which is a lightweight query language for modifying XML data.

It is an even further object of the present invention to use a proprietary XML schema.

It is an even further object of the present invention to use the technology known as the Semantic Web.

It is an even further object of the present invention to use a technology known as HTML 5.0.

BRIEF DESCRIPTION OF THE FIGURES

FIG. 1 is a diagram of the present invention.

SUMMARY OF THE INVENTION

The invention, in its simplest embodiment, is a hybrid real world and virtual world marketing and advertising system that is agile, can employ virtually any single or combination of marketing and advertising methods, such as, but not limited to, cross-branding, ambush marketing, article marketing, article video marketing, digital market, direct marketing, diversity marketing, mega-marketing, multi-level marketing, cause marketing, close range marketing, cloud marketing, communal marketing, consumer-generated marketing, cross-media marketing, customer advocacy marketing, database marketing, ethical marketing, evangelism marketing, figure of merit marketing, global marketing, guerrilla marketing, inbound marketing, influencer marketing, Internet marketing, nano-campaign marketing, next best action marketing, permission marketing, proximity marketing, reality marketing, relationship marketing, shopper marketing, undercover marketing, loyalty marketing, etc, uses on-demand printing, and existing methods of Free Delivery of real world objects as a means of Free Delivery of hard copy advertising and marketing materials to a consumer, including a system for Coupon Exchange, in which the coupon may be hard copy or soft copy, which includes a uniquely identified bar code or other uniquely identified machine readable code, or which may be configured as a structured or semi-structured electronic message, in which the coupons, which may be hard copy or soft copy, which includes a uniquely identified bar code or other uniquely identified machine readable code, or which may be configured as a structured or semi-structured electronic message, can be hard copy or soft copy. In addition, the coupons, which may be hard copy or soft copy, which includes a uniquely identified bar code or other uniquely identified machine readable code, or which may be configured as a structured or semi-structured electronic message, can be bar coded, or not.

Furthermore, the present invention relates to the use of Free Delivery to create a new system, method, and apparatus for delivering hard copy advertising and marketing materials to a consumer, which includes a system, method, and apparatus for Coupon Exchange, in which the coupon may be hard copy or soft copy, which includes a uniquely identified bar code or other uniquely identified machine readable code, or which may be configured as a structured or semi-structured electronic message, in addition data may be exchanged within the present invention using unique data encoding unstructured and untagged text message protocols to form a text message body that can be used to transmit and receive semi-structured, or structured text message bodies, which optionally may also use various, widely used Markup Languages. The semi-structure, or structure used within the text message body can be a format, such as, but not limited to, RFID, EDI, barcodes, partitioning and/or comma delimited values, etc. The tagging for use with the text message body can be a protocol, such as, but not limited to, Extensible Markup Language (XML), to form a new type of text message body that can be used to transmit and receive over wired and/or wireless communication systems semi-structured, or structured text message bodies, which optionally may also use various, widely used Markup Languages.

A coupon is defined as a ticket or document that can be exchanged for a financial discount or rebate when purchasing a product. Customarily, coupons, which may be hard copy or soft copy, which includes a uniquely identified bar code or other uniquely identified machine readable code, or which may be configured as a structured or semi-structured electronic message, are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons, which may be hard copy or soft copy, which includes a uniquely identified bar code or other uniquely identified machine readable code, or which may be configured as a structured or semi-structured electronic message, function as a form of price discrimination, enabling retailers to offer a lower price only to those consumers who would otherwise go elsewhere. In addition, coupons, which may be hard copy or soft copy, which includes a uniquely identified bar code or other uniquely identified machine readable code, or which may be configured as a structured or semi-structured electronic message, can also be targeted selectively to regional markets in which price competition is great.

Coupons, which may be hard copy or soft copy, which includes a uniquely identified bar code or other uniquely identified machine readable code, or which may be configured as a structured or semi-structured electronic message, can be used to research the price sensitivity of different groups of buyers (by sending out coupons, which may be hard copy or soft copy, which includes a uniquely identified bar code or other uniquely identified machine readable code, or which may be configured as a structured or semi-structured electronic message, with different dollar values to different groups). In addition, it is generally assumed that buyers who take the effort to collect and use coupons, which may be hard copy or soft copy, which includes a uniquely identified bar code or other uniquely identified machine readable code, or which may be configured as a structured or semi-structured electronic message, are more price sensitive than those who do not. Therefore, the posted price paid by price-insensitive buyers can be increased, while using coupon discounts to maintain the price for price-sensitive buyers (who would not buy at a higher price).

Customers may get these coupons, which may be hard copy or soft copy, which includes a uniquely identified bar code or other uniquely identified machine readable code, or which may be configured as a structured or semi-structured electronic message, from various sources, including national newspapers and the Internet, with web sites offering free printable grocery coupons, which may be hard copy or soft copy, which includes a uniquely identified bar code or other uniquely identified machine readable code, or which may be configured as a structured or semi-structured electronic message, can be printed at home and use them at retail store. Some major grocery chains also produce digital coupons, which may be hard copy or soft copy, which includes a uniquely identified bar code or other uniquely identified machine readable code, or which may be configured as a structured or semi-structured electronic message, that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons, which may be hard copy or soft copy, which includes a uniquely identified bar code or other uniquely identified machine readable code, or which may be configured as a structured or semi-structured electronic message, as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons, which may be hard copy or soft copy, which includes a uniquely identified bar code or other uniquely identified machine readable code, or which may be configured as a structured or semi-structured electronic message, typically provide for reduced cost or free shipping, a specific dollar or percentage discount, or some other offer to encourage consumers to purchase specific products or to purchase from specific retailers. Because paper coupons, which may be hard copy or soft copy, which includes a uniquely identified bar code or other uniquely identified machine readable code, or which may be configured as a structured or semi-structured electronic message, would be difficult to redeem, typically secret words or codes are distributed for consumers to type in at checkout. Marketers can use different codes for different channels our groups in order to distinguish response rates.

A Mobile Coupon is an electronic ticket solicited and or delivered to a mobile phone that can be exchanged for financial discount or rebate when purchasing product or service. These Mobile Coupons, which may be hard copy or soft copy, which includes a uniquely identified bar code or other uniquely identified machine readable code, or which may be configured as a structured or semi-structured electronic message, can be bar coded, or not. Customarily coupons are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the Mobile Coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute Mobile Coupons, which may be hard copy or soft copy, which includes a uniquely identified bar code or other uniquely identified machine readable code, or which may be configured as a structured or semi-structured electronic message.

DETAILED DESCRIPTION OF VARIOUS EMBODIMENTS

The present invention relates to the use of Free Delivery to create a new system, method, and apparatus for delivering hard copy advertising and marketing materials to a consumer, which include a system, method, and apparatus for Coupon Exchange, in which the coupon may be hard copy or soft copy, which includes a uniquely identified bar code or other uniquely identified machine readable code, or which may be configured as a structured or semi-structured electronic message, in addition data may be exchanged within the present invention using unique data encoding unstructured and untagged text message protocols to form a text message body that can be used to transmit and receive semi-structured, or structured text message bodies, which optionally may also use various, widely used Markup Languages. The semi-structure, or structure used within the text message body can be a format, such as, but not limited to, RFID, EDI, barcodes, partitioning and/or comma delimited values, etc. The tagging for use with the text message body can be a protocol, such as, but not limited to, Extensible Markup Language (XML), to form a new type of text message body that can be used to transmit and receive over wired and/or wireless communication systems semi-structured, or structured text message bodies, which optionally may also use various, widely used Markup Languages.

The preferred embodiment of the present invention, including a system for Coupon Exchange, in which the coupon may be hard copy or soft copy, which includes a uniquely identified bar code or other uniquely identified machine readable code, or which may be configured as a structured or semi-structured electronic message, is illustrated in FIG. 1, which consists of the following elements:

Consumer 100, which is an individual or household that use goods and services generated within the economy.

Local Printer 101, which is a peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multifunction devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Local Printer 101 can be used within the present invention to print coupons, which may be hard copy or soft copy, which includes a uniquely identified bar code or other uniquely identified machine readable code, or which may be configured as a structured or semi-structured electronic message. A coupon is defined as a ticket or document that can be exchanged for a financial discount or rebate when purchasing a product. Customarily, coupons, which may be hard copy or soft copy, which includes a uniquely identified bar code or other uniquely identified machine readable code, or which may be configured as a structured or semi-structured electronic message, are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons, which may be hard copy or soft copy, which includes a uniquely identified bar code or other uniquely identified machine readable code, or which may be configured as a structured or semi-structured electronic message, function as a form of price discrimination, enabling retailers to offer a lower price only to those consumers who would otherwise go elsewhere. In addition, coupons, which may be hard copy or soft copy, which includes a uniquely identified bar code or other uniquely identified machine readable code, or which may be configured as a structured or semi-structured electronic message, can also be targeted selectively to regional markets in which price competition is great.

Coupons, which may be hard copy or soft copy, which includes a uniquely identified bar code or other uniquely identified machine readable code, or which may be configured as a structured or semi-structured electronic message, can be used to research the price sensitivity of different groups of buyers (by sending out coupons, which may be hard copy or soft copy, which includes a uniquely identified bar code or other uniquely identified machine readable code, or which may be configured as a structured or semi-structured electronic message, with different dollar values to different groups). In addition, it is generally assumed that buyers who take the effort to collect and use coupons, which may be hard copy or soft copy, which includes a uniquely identified bar code or other uniquely identified machine readable code, or which may be configured as a structured or semi-structured electronic message, are more price sensitive than those who do not. Therefore, the posted price paid by price-insensitive buyers can be increased, while using coupon discounts to maintain the price for price-sensitive buyers (who would not buy at a higher price).

Customers may get these coupons, which may be hard copy or soft copy, which includes a uniquely identified bar code or other uniquely identified machine readable code, or which may be configured as a structured or semi-structured electronic message, from various sources, including national newspapers and the Internet, with web sites offering free printable grocery coupons, which may be hard copy or soft copy, which includes a uniquely identified bar code or other uniquely identified machine readable code, or which may be configured as a structured or semi-structured electronic message, can be printed at home and use them at retail store. Some major grocery chains also produce digital coupons, which may be hard copy or soft copy, which includes a uniquely identified bar code or other uniquely identified machine readable code, or which may be configured as a structured or semi-structured electronic message, that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons, which may be hard copy or soft copy, which includes a uniquely identified bar code or other uniquely identified machine readable code, or which may be configured as a structured or semi-structured electronic message, as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons, which may be hard copy or soft copy, which includes a uniquely identified bar code or other uniquely identified machine readable code, or which may be configured as a structured or semi-structured electronic message, typically provide for reduced cost or free shipping, a specific dollar or percentage discount, or some other offer to encourage consumers to purchase specific products or to purchase from specific retailers. Because paper coupons, which may be hard copy or soft copy, which includes a uniquely identified bar code or other uniquely identified machine readable code, or which may be configured as a structured or semi-structured electronic message, would be difficult to redeem, typically secret words or codes are distributed for consumers to type in at checkout. Marketers can use different codes for different channels our groups in order to distinguish response rates.

A Mobile Coupon is an electronic ticket solicited and or delivered to a mobile phone that can be exchanged for financial discount or rebate when purchasing product or service. Customarily coupons are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the Mobile Coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute Mobile Coupons, which may be hard copy or soft copy, which includes a uniquely identified bar code or other uniquely identified machine readable code, or which may be configured as a structured or semi-structured electronic message. These Mobile Coupons, which may be hard copy or soft copy, which includes a uniquely identified bar code or other uniquely identified machine readable code, or which may be configured as a structured or semi-structured electronic message, can be bar coded, or not.

Business 110, (also known as enterprise or firm) is an organization designed to provide goods, services, or both to consumers. Businesses are predominant in capitalist economies, in which most of them are privately owned and formed to earn profit to increase the wealth of their owners. Businesses may also form not-for-profit or be state-owned. A business owned by multiple individuals may be referred to as a company, although that term also has a more precise meaning.

The etymology of "business" relates to the state of being busy either as an individual or society as a whole, doing commercially viable and profitable work. The term "business" has at least three usages, depending on the scope—the singular usage to mean a particular organization; the generalized usage to refer to a particular market sector, "the music business" and compound forms such as agribusiness; and the broadest meaning, which encompasses all activity by the community of suppliers of goods and services.

Local Printer 111, which is a peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multifunction devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Local Printer 111 can be used within the present invention to print coupons, which may be hard copy or soft copy, which includes a uniquely identified bar code or other uniquely identified machine readable code, or which may be configured as a structured or semi-structured electronic message. A coupon is defined as: a ticket or document that can be exchanged for a financial discount or rebate when purchasing a product. Customarily, coupons, which may be hard copy or soft copy, which includes a uniquely identified bar code or other uniquely identified machine readable code, or which may be configured as a structured or semi-structured electronic message, are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons, which may be hard copy or soft copy, which includes a uniquely identified bar code or other uniquely identified machine readable code, or which may be configured as a structured or semi-structured electronic message, function as a form of price discrimination, enabling retailers to offer a lower price only to those consumers who would otherwise go elsewhere. In addition, coupons, which may be hard copy or soft copy, which includes a uniquely identified bar code or other uniquely identified machine readable code, or which may be configured as a structured or semi-structured electronic message, can also be targeted selectively to regional markets in which price competition is great.

Coupons, which may be hard copy or soft copy, which includes a uniquely identified bar code or other uniquely identified machine readable code, or which may be configured as a structured or semi-structured electronic message, can be used to research the price sensitivity of different groups of buyers (by sending out coupons, which may be hard copy or soft copy, which includes a uniquely identified bar code or other uniquely identified machine readable code, or which may be configured as a structured or semi-structured electronic message, with different dollar values to different groups). In addition, it is generally assumed that buyers who take the effort to collect and use coupons, which may be hard copy or soft copy, which includes a uniquely identified bar code or other uniquely identified machine readable code, or which may be configured as a structured or semi-structured electronic message, are more price sensitive than those who do not. Therefore, the posted price paid by price-insensitive buyers can be increased, while using coupon discounts to maintain the price for price-sensitive buyers (who would not buy at a higher price).

Customers may get these coupons, which may be hard copy or soft copy, which includes a uniquely identified bar code or other uniquely identified machine readable code, or which may be configured as a structured or semi-structured electronic message, from various sources, including national newspapers and the Internet, with web sites offering free printable grocery coupons, which may be hard copy or soft copy, which includes a uniquely identified bar code or other uniquely identified machine readable code, or which may be configured as a structured or semi-structured electronic message, can be printed at home and use them at retail store. Some major grocery chains also produce digital coupons, which may be hard copy or soft copy, which includes a uniquely identified bar code or other uniquely identified machine readable code, or which may be configured as a structured or semi-structured electronic message, that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons, which may be hard copy or soft copy, which includes a uniquely identified bar code or other uniquely identified machine readable code, or which may be configured as a structured or semi-structured electronic message, as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons, which may be hard copy or soft copy, which includes a uniquely identified bar code or other uniquely identified machine readable code, or which may be configured as a structured or semi-structured electronic message, typically provide for reduced cost or free shipping, a specific dollar or percentage discount, or some other offer to encourage consumers to purchase specific products or to purchase from specific retailers. Because paper coupons, which may be hard copy or soft copy, which includes a uniquely identified bar code or other uniquely identified machine readable code, or which may be configured as a structured or semi-structured electronic message, would be difficult to redeem, typically secret words or codes are distributed for consumers to type in at checkout. Marketers can use different codes for different channels our groups in order to distinguish response rates.

A Mobile Coupon is an electronic ticket solicited and or delivered to a mobile phone that can be exchanged for financial discount or rebate when purchasing product or service. Customarily coupons are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the Mobile Coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute Mobile Coupons, which may be hard copy or soft copy, which includes a uniquely identified bar code or other uniquely identified machine readable code, or which may be configured as a structured or semi-structured electronic message.

Remote Print Shop 140, (also known as enterprise or firm) is an organization designed to provide printing of hard-copy advertising and marketing materials a service to Business 110. Businesses are predominant in capitalist economies, in which most of them are privately owned and formed to earn profit to increase the wealth of their owners. Businesses may also form not-for-profit or be state-owned. A business owned by multiple individuals may be referred to as a company, although that term also has a more precise meaning.

The etymology of "business" relates to the state of being busy either as an individual or society as a whole, doing commercially viable and profitable work. The term "business" has at least three usages, depending on the scope—the singular usage to mean a particular organization; the generalized usage to refer to a particular market sector, "the music business" and compound forms such as agribusiness; and the broadest meaning, which encompasses all activity by the community of suppliers of goods and services.

Local Printer 141, which is a peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multifunction devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Local Printer 141 can be used within the present invention to print coupons, which may be hard copy or soft copy, which includes a uniquely identified bar code or other uniquely identified machine readable code, or which may be configured as a structured or semi-structured electronic message. A coupon is defined as: a ticket or document that can be exchanged for a financial discount or rebate when purchasing a product. Customarily, coupons, which may be hard copy or soft copy, which includes a uniquely identified bar code or other uniquely identified machine readable code, or which may be configured as a structured or semi-structured electronic message, are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, Coupons, which may be hard copy or soft copy, which includes a uniquely identified bar code or other uniquely identified machine readable code, or which may be configured as a structured or semi-structured electronic message, function as a form of price discrimination, enabling retailers to offer a lower price only to those consumers who would otherwise go elsewhere. In addition, coupons, which may be hard copy or soft copy, which includes a uniquely identified bar code or other uniquely identified machine readable code, or which may be configured as a structured or semi-structured electronic message, can also be targeted selectively to regional markets in which price competition is great.

Coupons, which may be hard copy or soft copy, which includes a uniquely identified bar code or other uniquely identified machine readable code, or which may be configured as a structured or semi-structured electronic message, can be used to research the price sensitivity of different groups of buyers (by sending out coupons, which may be hard copy or soft copy, which includes a uniquely identified bar code or other uniquely identified machine readable code, or which may be configured as a structured or semi-structured electronic message, with different dollar values to different groups). In addition, it is generally assumed that buyers who take the effort to collect and use coupons, which may be hard copy or soft copy, which includes a uniquely identified bar code or other uniquely identified machine readable code, or which may be configured as a structured or semi-structured electronic message, are more price sensitive than those who do not. Therefore, the posted price paid by price-insensitive buyers can be increased, while using coupon discounts to maintain the price for price-sensitive buyers (who would not buy at a higher price).

Businesses or Customers may get these coupons, which may be hard copy or soft copy, which includes a uniquely identified bar code or other uniquely identified machine readable code, or which may be configured as a structured or semi-structured electronic message, from various sources, including national newspapers and the Internet, with web sites offering free printable grocery coupons, which may be hard copy or soft copy, which includes a uniquely identified bar code or other uniquely identified machine, readable code, or which may be configured as a structured or semi-structured electronic message, can be printed at home and use them at retail store. Some major grocery chains also produce digital coupons, which may be hard copy or soft copy, which includes a uniquely identified bar code or other uniquely identified machine readable code, or which may be configured as a structured or semi-structured electronic message, that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons, which may be hard copy or soft copy, which includes a uniquely identified bar code or other uniquely identified machine readable code, or which may be configured as a structured or semi-structured electronic message, as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons, which may be hard copy or soft copy, which includes a uniquely identified bar code or other uniquely identified machine readable code, or which may be configured as a structured or semi-structured electronic message, typically provide for reduced cost or free shipping, a specific dollar or percentage discount, or some other offer to encourage consumers to purchase specific products or to purchase from specific retailers. Because paper coupons, which may be hard copy or soft copy, which includes a uniquely identified bar code or other uniquely identified machine readable code, or which may be configured as a structured or semi-structured electronic message, would be difficult to redeem, typically secret words or codes are distributed for consumers to type in at checkout. Marketers can use different codes for different channels our groups in order to distinguish response rates.

A Mobile Coupon is an electronic ticket solicited and or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the Mobile Coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute Mobile Coupons, which may be hard copy or soft copy, which includes a uniquely identified bar code or other uniquely identified machine readable code, or which may be configured as a structured or semi-structured electronic message.

Private WiFi Broadcast 112. A Wi-Fi enabled device such as a personal computer, video game console, smartphone, or digital audio player can connect to the Internet when within range of a wireless network connected to the Internet. The coverage of one or more (interconnected) access points—called hotspots when offering public access—generally comprises an area the size of a few rooms but may be expanded to cover many square miles, depending on the number of access points with overlapping coverage.

'Wi-Fi' is not a technical term, but it is generally used to describe only a narrow range of connectivity technologies including wireless local area network (WLAN) based on the IEEE 802.11 standards, device to device connectivity (such as Wi-Fi Peer to Peer AKA Wi-Fi Direct), and a range of technologies that support PAN, LAN and even WAN connections. Derivative terms, such as Super Wi-Fi, coined by the U.S. Federal Communications Commission (FCC) to describe proposed networking in the former UHF TV band in the US.

The technical term "IEEE 802.11" has been used interchangeably with Wi-Fi, but over the past few years Wi-Fi has become a super-set of IEEE 802.11. Wi-Fi is used by over 700 million people, there are over 750,000 hotspots (places with Wi-Fi Internet connectivity) around the world, and about 800 million new Wi-Fi devices every year. Wi-Fi products that complete the Wi-Fi Alliance interoperability certification testing successfully can use the Wi-Fi CERTIFIED designation and trademark.

Not every Wi-Fi device is submitted for certification to the Wi-Fi Alliance. The lack of Wi-Fi certification does not necessarily imply a device is incompatible with Wi-Fi devices/protocols. If it is compliant or partly compatible, the Wi-Fi Alliance may not object to its description as a Wi-Fi device though technically only the CERTIFIED designation carries their approval.

Wi-Fi certified and compliant devices are installed in many personal computers, video game consoles, MP3 players, smart-phones, printers, digital cameras, and laptop computers.

A Private Wi-Fi broadcast is one in which a business provides wireless advertising using Wi-Fi technology without allowing consumer 100 to connect to the Internet.

Internet Cloud 120, is a global system of interconnected computer networks that use the standard Internet Protocol Suite (TCP/IP) to serve billions of users worldwide. It is a network of networks that consists of millions of private, public, academic, business, and government networks, of local to global scope, that are linked by a broad array of electronic, wireless and optical networking technologies. The Internet carries a vast range of information resources and services, such as the inter-linked hypertext documents of the World Wide Web (WWW) and the infrastructure to support electronic mail.

Web App 130, is a singular application, or alternatively a collection of inter-related apps, running on a server (not shown) that is accessed over a network such as the Internet Cloud 120 or an intranet (not shown). The term may also mean a computer software that is hosted in a browser-controlled environment (e.g. a Java applet) or coded in a browser-supported language (such as JavaScript, combined with a browser-rendered markup language like HTML) and reliant on a common web browser to render the application executable.

Web App 130 represents the collective databases, web services, servers, etc, required to provide the functionality of the present invention. A database is an organized collection of data for one or more purposes, usually in digital form. The data are typically organized to model relevant aspects of reality (for example, the availability of rooms in hotels), in a way that supports processes requiring this information (for example, finding a hotel with vacancies). The term "database" refers both to the way its users view it, and to the logical and physical materialization of its data, content, in files, computer memory, and computer data storage. This definition is very general, and is independent of the technology used. However, not every collection of data is a database; the term database implies that the data is managed to some level of quality (measured in terms of accuracy, availability, usability, and resilience) and this in turn often implies the use of a general-purpose Database management system (DBMS). A general-purpose DBMS is typically a complex software system that meets many usage requirements, and the databases that it maintains are often large and complex.

The term database is correctly applied to the data and data structures themselves, and is different from the DBMS which is a software system that allows to store and change the database (i.e., the data), as well as retrieve information from it. The structure of a database is generally too complex to be handled without its DBMS, and any attempt to do otherwise is very likely to result in database corruption. DBMSs are packaged as computer software products: well-known products include the Oracle DBMS, Access and SQL Server from Microsoft, DB2 from IBM and the Open source DBMS MySQL. Each such DBMS product currently supports many thousands of databases all over the world. The stored data in a database is not generally portable across different DBMS, but can inter-operate to some degree (while each DBMS type controls a database of its own database type) using standards like SQL and ODBC. A successful general-purpose DBMS is designed in such a way that it can satisfy as many different possible applications and application designers as possible. A DBMS also needs to provide effective run-time execution to properly support (e.g., in terms of performance, availability, and security) as many end-users (the database's application users) as needed. Sometimes the combination of a database and its respective DBMS is referred to as a Database system (DBS).

A database is typically organized according to general Data models that have evolved since the late 1960s. Notable are the Relational model (all the DBMS types listed above support databases based on this model), the Entity-relationship model (ERM; primarily utilized to design databases), and the Object model (which has more expressive power than the relational, but is more complicated and less commonly used). Some recent database products use XML as their data model. A single database may be viewed for convenience within different data models that are mapped between each other (e.g., mapping between ERM and RM is very common in the database design process, and supported by many database design tools, often within the DBMS itself). Many DBMSs support one data model only, externalized to database developers, but some allow different data models to be used and combined.

The design and maintenance of a complex database requires specialist skills: the staff performing this function are referred to as database application programmers (different from the DBMS developers/programmers) and database administrators, and their task is supported by tools provided either as part of the DBMS or as free-standing (stand-alone) software products. These tools include specialized Database languages including Data Description Languages, Data Manipulation Languages, and Query Languages. These can be seen as special-purpose programming languages, tailored specifically to manipulate databases; sometimes they are provided as extensions of existing programming languages, with added special database commands. These languages are generally specific to one data model, and in many cases they are specific to one DBMS. The most widely supported standard database language is SQL, which combines the roles of Data Description Language, Data manipulation language, and a Query language.

Web Apps are popular due to the ubiquity of web browsers, and the convenience of using a web browser as a client, sometimes called a thin client. The ability to update and maintain Web Applications without distributing and installing software on potentially thousands of client computers is a key reason for their popularity, as is the inherent support for cross-platform compatibility. Common Web Applications include web-mail, on-line retail sales, on-line auctions, wikis and many other functions.

A coupon is defined as a ticket or document that can be exchanged for a financial discount or rebate when purchasing a product. Customarily, coupons, which may be hard copy or soft copy, which includes a uniquely identified bar code or other uniquely identified machine readable code, or which may be configured as a structured or semi-structured electronic message, are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons, which may be hard copy or soft copy, which includes a uniquely identified bar code or other uniquely identified machine readable code, or which may be configured as a structured or semi-structured electronic message, function as a form of price discrimination, enabling retailers to offer a lower price only to those consumers who would otherwise go elsewhere. In addition, coupons, which may be hard copy or soft copy, which includes a uniquely identified bar code or other uniquely identified machine readable code, or which may be configured as a structured or semi-structured electronic message, can also be targeted selectively to regional markets in which price competition is great.

Coupons, which may be hard copy or soft copy, which includes a uniquely identified bar code or other uniquely identified machine readable code, or which may be configured as a structured or semi-structured electronic message, can be used to research the price sensitivity of different groups of buyers (by sending out coupons, which may be hard copy or soft copy, which includes a uniquely identified bar code or other uniquely identified machine readable code, or which may be configured as a structured or semi-structured electronic message, with different dollar values to different groups). In addition, it is generally assumed that buyers who take the effort to collect and use coupons, which may be hard copy or soft copy, which includes a uniquely identified bar code or other uniquely identified machine readable code, or which may be configured as a structured or semi-structured electronic message, are more price sensitive than those who do not. Therefore, the posted price paid by price-insensitive buyers can be increased, while using coupon discounts to maintain the price for price-sensitive buyers (who would not buy at a higher price).

Customers may get these coupons, which may be hard copy or soft copy, which includes a uniquely identified bar code or other uniquely identified machine readable code, or which may be configured as a structured or semi-structured electronic message, from various sources, including national newspapers and the Internet, with web sites offering free printable grocery coupons, which may be hard copy or soft copy, which includes a uniquely identified bar code or other uniquely identified machine readable code, or which may be configured as a structured or semi-structured electronic message, can be printed at home and use them at retail store. Some major grocery chains also produce digital coupons, which may be hard copy or soft copy, which includes a uniquely identified bar code or other uniquely identified machine readable code, or which may be configured as a structured or semi-structured electronic message, that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons, which may be hard copy or soft copy, which includes a uniquely identified bar code or other uniquely identified machine readable code, or which may be configured as a structured or semi-structured electronic message, as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons, which may be hard copy or soft copy, which includes a uniquely identified bar code or other uniquely identified machine readable code, or which may be configured as a structured or semi-structured electronic message, typically provide for reduced cost or free shipping, a specific dollar or percentage discount, or some other offer to encourage consumers to purchase specific products or to purchase from specific retailers. Because paper coupons, which may be hard copy or soft copy, which includes a uniquely identified bar code or other uniquely identified machine readable code, or which may be configured as a structured or semi-structured electronic message, would be difficult to redeem, typically secret words or codes are distributed for consumers to type in at checkout. Marketers can use different codes for different channels our groups in order to distinguish response rates.

A Mobile Coupon is an electronic ticket solicited and or delivered to a mobile phone that can be exchanged for financial discount or rebate when purchasing product or service. Customarily coupons are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the Mobile Coupon at store; some retailers forward the redemption to a clearinghouse for final processing. Mobile Coupons, which may be hard copy or soft copy, which includes a uniquely identified bar code or other uniquely identified machine readable code, or which may be configured as a structured or semi-structured electronic message, includes a bar code, or not.

The present invention can use proprietary technology to exchange data, including unstructured and untagged text message protocols to form a new type of text message body that can be used to transmit and receive over wired and/or wireless communication systems semi-structured, or structured text message bodies, which optionally may also use various, widely used Markup Languages. The semi-structure, or structure used within the text message body can be a format, such as, but not limited to, RFID, EDI, barcodes, partitions, etc. The tagging for use with the text message body can be a protocol, such as, but not limited to, Extensible Markup Language (XML). Simply put, the text message body can be encoded as a partitioned barcode, or an RFID tag. These encodings can be based on EPGglobal standards, as an example. In other words, the phone becomes the barcode, without displaying a barcode, or the phone becomes an RFID tag.

There are a wide variety of embodiments covered by a person's invention that will be obvious to those skilled in the art. A few of the various illustrative embodiments that include some of the features described previously in the "Features And Objects Of The Present Invention" are described below.

Cellphones are used by billions of people worldwide. Modern cellphones are part computer and part radio. They provide an incredible array of functions, including, but not limited to, creating and storing contact data, creating and storing task or to-do lists, creating and storing appointments and reminders, using calculators to do math, send and receive e-mail or text messages, get data, play games, watch TV, etc.

The novelty of the cellular system is the division of a city, or an area into small cells a person's allows extensive frequency reuse, so millions of people can use cellphones simultaneously.

Cellphones are full-duplex devices, which means one frequency is used for talking and a second, separate frequency is used for listening. Basically, both people on the call can talk at once. The transmissions of a base station and the phones within its cell do not make it very far outside a particular cell, which means cells can reuse the same frequencies within a city, or area The cellular approach requires a large number of base stations in a city of any particular size. A typical large city can have hundreds, or thousands of cell towers. Each carrier in each city also runs one central office called the Mobile Telephone Switching Office (MTSO) a person's office handles all of the phone connections to the normal land-based phone system, and controls all of the base stations in the region.

All cellphones have special codes associated with them. These codes are used to identify the phone, the phone's owner and the service provider:
1) Electronic Serial Number (ESN)—a unique 32-bit number programmed into the phone when it is manufactured
2) Mobile Identification Number'(MIN)—a 10-digit number derived from a person's phone's number
3) System Identification Code (SID)—a unique 5-digit number that is assigned to each carrier by the FCC As an example, if a person has their cellphone turned on, and someone initiates a call to that particular cellphone, here's what happens during the call:
1) When a person first power up the phone, it listens for an SID on the control channel. The control channel is a special frequency that the phone and base station use to talk to one another about things like call set-up and channel changing. If the phone cannot find any control channels to listen to, it knows it is out of range and displays a "no service" message.
2) When it receives the SID, the phone compares it to the SID programmed into the phone. If the SIDs match, the phone knows that the cell it is communicating with is part of its home system.
3) Along with the SID, the phone also transmits a registration request, and the MTSO keeps track of a person's phone's location in a database—a person's way, the MTSO knows which cell a person are in when it wants to ring a person's phone.
4) The MTSO gets the call, and it tries to find you. It looks in its database to see which cell a person are in.
5) The MTSO picks a frequency pair that a person's phone will use in that cell to take the call.
6) The MTSO communicates with a person's phone over the control channel to tell it which frequencies to use, and once a person's phone and the tower switch on those frequencies, the call is connected. Now, a person are talking by two-way radio to a friend.
7) As a person moves toward the edge of a person's cell, a person's cell's base station notes that a person's signal strength is diminishing. Meanwhile, the base station in the cell a person are moving toward (which is listening and measuring signal strength on all frequencies, not just its own one-seventh) sees a person's phone's signal strength increasing. The two base stations coordinate with each other through the MTSO, and at some point, a person's phone gets a signal on a control channel telling it to change frequencies. The network hand off switches a person's phone to the new cell.

A typical cellphone includes the following parts:
1) A circuit board containing the brains of the phone
2) An antenna
3) A liquid crystal display (LCD)
4) A keyboard (not unlike the one a person find in a TV remote control)
5) A microphone
6) A speaker
7) A battery The circuit board is the heart of the system. The analog-to-digital and digital-to-analog conversion chips translate the outgoing audio signal from analog to digital and the incoming signal from digital back to analog. The digital signal processor (DSP) is a highly customized processor designed to perform signal-manipulation calculations at high speed.

The microprocessor handles all of the housekeeping chores for the keyboard and display, deals with command and control signaling with the base station and also coordinates the rest of the functions on the board.

The ROM and Flash memory chips provide storage for the phone's operating system and customizable features, such as the phone directory. The radio frequency (RF) and power section handles power management and recharging, and also deals with the hundreds of FM channels. Finally, the RF amplifiers handle signals traveling to and from the antenna.

The display has grown considerably in size as the number of features in cellphones have increased. Most current phones offer built-in phone directories, calculators and games. And many of the phones incorporate some type of PDA or Web browser.

A recent advancement in cellphone technology is pic-cells and femto-cells. Typically the range of a pico-cell is 200 meters or less, and a femto-cell is on the order of 10 meters.

A pico-cell is a small cellular base-station typically covering a small area, such as in-building including, but not limited to, offices, shopping malls, train stations, stock exchanges, etc., or more recently in aircraft. In cellular networks, pico-cells are typically used to extend coverage to indoor areas where outdoor signals do not reach well, or to add network capacity in areas with very dense phone usage, such as train stations. pico-cells provide coverage and capacity in areas difficult or expensive to reach using the more traditional macro-cell approach.

In cellular wireless networks, such as GSM, the pico-cell base station is typically a low cost, small, reasonably simple, and connects to a Base Station Controller (BSC). Multiple pico-cell 'heads' connect to each BSC: the BSC performs radio resource management and hand-over functions, and aggregates data to be passed to the Mobile Switching Center (MSC) and/or the Gateway GPRS Support Node (GGSN).

More recent work has developed the concept towards a head unit containing not only a pico-cell, but also many of the functions of the BSC and some of the MSC. This form of pico-cell is sometimes called an access point base station or 'enterprise femto-cell'. In this case, the unit contains all the capability required to connect directly to the Internet, without the need for the BSC/MSC infrastructure. This is potentially a more cost effective approach.

Pico-cells offer many of the benefits of "small cells", similar to femto-cells, in that they improve data throughput for mobile users and increase capacity in the mobile network. In particular, the integration of pico-cells with macro-cells through a Heterogeneous Network can be useful in seamless hand-offs and increased mobile data capacity.

Pico-cells are available for most cellular technologies including GSM, CDMA, UMTS and LTE from various manufacturers.

A femto-cell is a small cellular base station, typically designed for use in a home or small business. It connects to the service provider's network via broadband, such as, but not limited to, DSL or cable. Current designs typically support 2 to 4 active mobile phones in a residential setting, and 8 to 16 active mobile phones in enterprise settings. A femto-cell allows service providers to extend service coverage indoors, especially where access would otherwise be limited or unavailable. Although much attention is focused on WCDMA, the concept is applicable to all standards, including, but not limited to, GSM, CDMA2000, TD-SCDMA, WiMAX and LTE solutions.

Femto-cells are an alternative way to deliver the benefits of fixed-mobile convergence (FMC). The distinction is that most FMC architectures require a new (dual-mode) handset which works with existing unlicensed spectrum home/enterprise wireless access points, while a femto-cell-based deployment will work with existing handsets but requires installation of a new access point that uses licensed spectrum.

Femto-cells are typically sold by a Mobile Network Operator (MNO) to its residential or enterprise customers. A femto-cell is typically the size of a residential gateway or smaller, and connects to the user's broadband line. Integrated femto-cells (which include both a DSL router and femto-cell) also exist. Once plugged in, the femto-cell connects to the MNO's mobile network, and provides extra coverage. From a user's perspective, it is plug and play, there is no specific installation or technical knowledge required—anyone can install a femto-cell at home.

In most cases the user must then declare which mobile phone numbers are allowed to connect to their femto-cell, usually via a web interface provided by the MNO. This only needs to be done once. When these mobile phones arrive under coverage of the femto-cell, they switch over from the macro-cell to the femto-cell automatically. Most MNOs provide a way for the user to know the person has happened, for example by having a different network name appear on the mobile phone. All communications will then automatically go through the femto-cell. When the user leaves the femto-cell coverage, whether or not in a call area, a person's phone hands over seamlessly to the macro network femto-cells require specific hardware, so existing WiFi or DSL routers cannot be upgraded to a femto-cell.

Once installed in a specific location, most femto-cells have protection mechanisms so that a location change will be reported to the MNO. Whether the MNO allows femto-cells to operate in a different location depends on the MNO's policy. International location change of a femto-cell is not permitted because the femto-cell transmits licensed frequencies which belong to different network operators in different countries.

Various standards bodies have published formal specifications for femto-cells for the most popular technologies, namely WCDMA, CDMA2000, LTE and WiMAX. These all broadly conform to an architecture with three major elements:
1) The femto-cell access points themselves, which embody greater network functionality than found in macro-cell base-stations, such as the radio resource control functions a person's allows much greater autonomy within the femto-cell, enabling self-configuration and self-optimization. femto-cells are connected using broadband IP, such as DSL or cable modems, to the network operator's core switching centers.

2) The femto-cell gateway, comprising a security gateway that terminates large numbers of encrypted IP data connections from hundreds of thousands of femto-cells, and a signaling gateway which aggregates and validates the signaling traffic, authenticates each femto-cell and interfaces with the mobile network core switches using standard protocols.

3) The management and operational system which allows software updates and diagnostic checks to be administered. These typically use the same TR.069 management protocol published by the Broadband Forum and also used for administration of residential modems.

The key interface in these architectures is that between the femto-cell access points and the femto-cell gateway.

Another key element of the present invention are text messages, also known as Short Message Service (SMS). Short Message Service (SMS) is the term used for short (up to 160 characters in the text message body depending on encoding) messages that are sent between mobile phones. Typically, it works like this:

1) A person sends a Short Message from their phone to a friend's phone.
2) The message goes to a Message Center.
3) If your friend is available—meaning, their phone is turned on, and they are in a cellphone service area, the Message Center sends the message to their phone.
4) If they are not available, the Message Center holds onto the message.
5) When your friend becomes available, their phone requests the messages, which are then delivered.

SMS stands for Short Message Service. Simply put, it is a method of communication that sends text between cellphones, or from a PC or handhold to a cellphone. The "short" part refers to the maximum size of the text messages: 160 characters (letters, numbers or symbols in the Latin alphabet). For other alphabets, such as Chinese, the maximum SMS size is 70 characters.

Even if a person is not talking on their cellphone, their phone is constantly sending and receiving information. It is talking to a cellphone tower over a pathway called a control channel. The reason for this chatter is so that the cellphone system knows which cell your phone is in, and so that your phone can change cells as you move around. Every so often, your phone and the tower will exchange a packet of data that lets both of them know that everything is operating correctly.

A person's cellphone also uses the control channel for call setup. When someone tries to call you, the tower sends your phone a message over the control channel that tells your phone to play its ring-tone. The tower also gives your phone a pair of voice channel frequencies to use for the call.

The control channel also provides the pathway for SMS messages. When someone sends you an SMS message, the message flows through the SMSC, then to the tower, and the tower sends the message to your phone as a little packet of data on the control channel. In the same way, when you send a message, your phone sends it to the tower on the control channel and it goes from the tower to the SMSC and from there to its destination.

The primary components of an SMS system include:

The SMSC (Short Message Service Center) is the entity which does the job of storing and forwarding messages to and from the mobile station. The SME (Short Message Entity), which is typically a mobile phone or a capable modem, can be located in the fixed network or a mobile station, receives and sends short messages.

The SMS GMSC (SMS gateway MSC) is a gateway MSC that can also receive short messages. The gateway MSC is a mobile network's point of contact with other networks. On receiving the short message from the short message center, GMSC uses the SS7 network to interrogate the current position of the mobile station form the HLR, the home location register.

The HLR is the main database in a mobile network. It holds information of the subscription profile of the mobile and also about the routing information for the subscriber, i.e. the area (covered by a MSC) where the mobile is currently situated. The GMSC is thus able to pass on the message to the correct MSC.

The MSC (Mobile Switching Center) is the entity in the network which does the job of switching connections between mobile stations or between mobile stations and the fixed network.

The VLR (Visitor Location Register) corresponds to each MSC and contains temporary information about the mobile, information like mobile identification and the cell (or a group of cells) where the mobile is currently situated. Using information form the VLR the MSC is able to switch the information (short message) to the corresponding BSS (Base Station System, BSC+BTSs), which transmits the short message to the mobile. The BSS consists of transceivers, which send and receive information over the air interface, to and from the mobile station. This information is passed over the signaling channels so the mobile can receive messages even if a voice or data call is going on.

The actual data format for the text message includes things like the length of the message, a time stamp, the destination phone number, the format, etc.

In addition to person-to-person messages, SMS can be used to send a message to a large number of people at a time, either from a list of contacts or to all the users within a particular area. This service is called broadcasting and is used by companies to contact groups of employees or by online services to distribute news and other information to subscribers.

The SMS text message consists of a header, which contains meta-data, such as the destination for the message, and the unstructured, untagged text message body. The present invention takes advantage of the unstructured text message body, and adds structure using data partitions—similar to RFID and barcodes, and/or comma delimited values. Furthermore, the present invention can add meta-data within the unstructured, untagged text message body.

Again, the present invention takes advantage of the unstructured text message body, and adds structure using data partitions—similar to RFID and barcodes, and/or comma delimited values. Furthermore, the present invention can add meta-data within the unstructured text message body to send/receive/identify coupons, which may be hard copy or soft copy, which includes a uniquely identified bar code or other uniquely identified machine readable code, or which may be configured as a structured or semi-structured electronic message, generated for Free Delivery, and for exchange in an optional Coupon Exchange, in which the coupon may be hard copy or soft copy, which includes a uniquely identified bar code or other uniquely identified machine readable code, or which may be configured as a structured or semi-structured electronic message, running on the present inventions Web App 130.

Optional Coupon Exchange, in which the coupon may be hard copy or soft copy, which includes a uniquely identified bar code or other uniquely identified machine readable code, or which may be configured as a structured or semi-structured electronic message, is run on Web App 130 can also be programmed to allow end-user, businesses, etc, to exchange coupons, which may be hard copy or soft copy, which includes a uniquely identified bar code or other uniquely identified machine readable code, or which may be configured as a structured or semi-structured electronic message, within the present invention. This unique feature provides a trading platform and bookkeeping system for its members or clients. Individual members, and member companies can register on Web App 130 to buy, sell, and trade coupons, which may be hard copy or soft copy, which includes a uniquely identified bar code or other uniquely identified machine readable code, or which may be configured as a structured or semi-structured electronic message, for products and services to each other using an internal currency. The coupons, which may be hard copy or soft copy, which includes a uniquely identified bar code or other uniquely identified machine readable code, or which may be configured as a structured or semi-structured electronic message, may be printed hard copy locally by a consumer, or transmitted soft copy as an electronic coupon, which may be hard copy or soft copy, which includes a uniquely identified bar code or other uniquely identified machine readable code, or which may be configured as a structured or semi-structured electronic message, which may also be known as a Mobile Coupon. The hard copy or soft copy coupons, which may be hard copy or soft copy, which includes a uniquely identified bar code or other uniquely identified machine readable code, or which may be configured as a structured or semi-structured electronic message, includes a bar code, or not. The Coupon Exchange, in which the coupon may be hard copy or soft copy, which includes a uniquely identified bar code or other uniquely identified machine readable code, or which may be configured as a structured or semi-structured electronic message, is an effective method for increasing sales, conserving cash, moving inventory, and making use of excess capacity for member companies worldwide. Members, and member companies registered in the coupons, which may be hard copy or soft copy, which includes a uniquely identified bar code or other uniquely identified machine readable code, or which may be configured as a structured or semi-structured electronic message, change system can earn exchange coupons, which may be hard copy or soft copy, which includes a uniquely identified bar code or other uniquely identified machine readable code, or which may be configured as a structured or semi-structured electronic message, which may be hard copy or soft copy, which includes a uniquely identified bar code or other uniquely identified machine readable code, or which may be configured as a structured or semi-structured electronic message, and/or credits (instead of cash) that are deposited into their account. Members, and member companies then have the ability to purchase goods and services from other members utilizing their coupons, which may be hard copy or soft copy, which includes a uniquely identified bar code or other uniquely identified machine readable code, or which may be configured as a structured or semi-structured electronic message, and/or trade credits—and they are not obligated to purchase from who they sold to, and vice-verse. The exchange plays an important role because they provide the record-keeping, brokering expertise and monthly statements to each member. The exchange can make money through Internet advertising, or by charging a commission on each transaction either all on the buy side, all on the sell side, or a combination of both. Fees may be collected per transaction, or at a flat recurring rate, or a combination of both.

As an example, the present invention is similar to StubHub, which is an online marketplace owned by eBay, which provides services for buyers and sellers of tickets for sports, concerts, theater and other live entertainment events.

Sellers post available tickets at any price they choose. Unlike other online ticket resellers, such as Craigslist (free) and eBay (up front price per listing), StubHub takes a 25% commission after the sale occurs (10% from the buyer, 15% from the seller). Sellers range from season ticket holders who want to unload tickets that would otherwise go unused to professional ticket brokers.

Using the StubHub website, a buyer may select from available tickets to an event. StubHub charges a buy fee of 10% of the purchase price of the tickets. A shipping and handling charge is then imposed and tickets are either shipped via FedEx Express, email delivered, available for instant download, or picked up the day of the event at a last-minute services office. In total, on a typical order, StubHub earns 20% of the purchase price of every ticket sold: buyers typically pay 10% more than the listed price and sellers receive 10-15% less than their listed price depending on certain seller metrics and bonuses. Criteria for reduced seller fees include confirm time, fill rate, and quarterly sales totals. Additional seller incentives include the ability to buy tickets without paying service fees.

The Coupon Exchange, in which the coupon may be hard copy or soft copy, which includes a uniquely identified bar code or other uniquely identified machine readable code, or which may be configured as a structured or semi-structured electronic message, operating on Web App 130 can also act as a global, worldwide decentralized market arbiter for exchanging coupons, which may be hard copy or soft copy, which includes a uniquely identified bar code or other uniquely identified machine readable code, or which may be configured as a structured or semi-structured electronic message, which may be hard copy or soft copy; which includes a uniquely identified bar code or other uniquely identified machine readable code, or which may be configured as a structured or semi-structured electronic message, coupons, which may be hard copy or soft copy, which includes a uniquely identified bar code or other uniquely identified machine readable code, or which may be configured as a structured or semi-structured electronic message, generated by the present invention for various business, groups, agencies, etc, or coupons, which may be hard copy or soft copy, which includes a uniquely identified bar code or other uniquely identified machine readable code, or which may be configured as a structured or semi-structured electronic message, generated by businesses, groups, agencies, etc, registered for exchange on the present invention. The Coupon Exchange, in which the coupon may be hard copy or soft copy, which includes a uniquely identified bar code or other uniquely identified machine readable code, or which may be configured as a structured or semi-structured electronic message, can act as an anchor of trading between a wide range of different types of members, and member companies buying, selling, and/or trading coupons, which may be hard copy or soft copy, which includes a uniquely identified bar code or other uniquely identified machine readable code, or which may be configured as a structured or semi-structured electronic message, whose intrinsic value is tied to the country, or countries a particular coupon is redeemable in vs. the underlying relative value of different currencies.

The Coupon Exchange, in which the coupon may be hard copy or soft copy, which includes a uniquely identified bar code or other uniquely identified machine readable code, or which may be configured as a structured or semi-structured electronic message, operating on Web App 130 can also act as a central exchange where members and member companies people can trade standardized futures contracts, which is a contract to buy specific quantities of coupons, which may be hard copy or soft copy, which includes a uniquely identified bar code or other uniquely identified machine readable code, or which may be configured as a structured or semi-structured electronic message, which may be hard copy or soft copy, which includes a uniquely identified bar code or other uniquely identified machine readable code, or which may be configured as a structured or semi-structured electronic message, or exchange credits at a specified price with the delivery set at a specified time in the future. This instrument may be priced according to the movement of the underlying asset, which may be a coupon, which may be hard copy or soft copy, which includes a uniquely identified bar code or other uniquely identified machine readable code, or which may be configured as a structured or semi-structured electronic message, or exchange credit. Web App 130 runs on at least one database (not shown) on at least one server (not shown). The database(s) are used to store information related to members, and member businesses. The demographic information stored on the present invention's database(s) can be used to drive a messaging system.

Coupons, which may be hard copy or soft copy, which includes a uniquely identified bar code or other uniquely identified machine readable code, or which may be configured as a structured or semi-structured electronic message, can be identified with individual numbers, or alpha-numeric characters, in order to make the coupons, which may be hard copy or soft copy, which includes a uniquely identified bar code or other uniquely identified machine readable code, or which may be configured as a structured or semi-structured electronic message, traceable as they move from issuer-to consumer-to perhaps at least one more consumer-to business to issuer.

The Coupons, which may be hard copy or soft copy, which includes a uniquely identified bar code or other uniquely identified machine readable code, or which may be configured as a structured or semi-structured electronic message, suitable for exchange can be printed and registered on-line, they can be electronic only, and delivered in e-mails, SMS text messages, MMS text messages, and also include mobile barcoded images that can be readily scanned.

The Coupon Exchange, in which the coupon may be hard copy or soft copy, which includes a uniquely identified bar code or other uniquely identified machine readable code, or which may be configured as a structured or semi-structured electronic message, can become the basis of its own social network similar to Facebook or Twitter, or be used in conjunction with Facebook or Twitter.

A social network is an online service, platform, or site that focuses on building and the reflecting of social networks or social relations among people, who, for example, share interests and/or activities, such as, but not limited to, couponing. The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention service could include user profiles, a user's social links, and a variety of additional services.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention services is web-based and provides a means for users to interact over the Internet, such as e-mail and instant messaging. The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention service could be designed to allow group-centered activities, and allow users to share ideas, activities, events, and interests within their individual networks.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention may be designed to take advantage of the FOAF standard and the Open Source Initiative.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention sites can be designed to encourage individual users to create profiles containing various information about themselves. Users may be able to upload pictures of themselves to their profiles, post blog entries for others to read, search for other users with similar interests, and compile and share lists of contacts. In addition, user profiles may be designed in the coupon social exchange network to have a section dedicated to comments from friends and other users. To protect user privacy, the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention can be designed to have controls that allow users to choose who can view their profile, contact them, add them to their list of contacts, and so on.

In addition, the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention can be used by a wide variety of organizations to create profiles to advertise products and services to individual users.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention may be designed with additional features, such as, but not limited to, the ability to create groups that share common interests or affiliations, upload or stream live videos, and hold discussions in forums.

A mobile version of the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention may be designed to allow users to create their own profiles, make friends, participate in chat rooms, create chat rooms, hold private conversations, share photos and videos, and share blogs by using their mobile phone. In addition, the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention may allow users to build their own mobile community and brand it.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention site may be designed around is the concepts of "real-time web" and "location-based." Real-time allows users to contribute content, which is then broadcast as it is being uploaded—the concept is analogous to live radio and television broadcasts. As an example, Twitter set the trend for "real-time" services, wherein users can broadcast to the world what they are doing, or what is on their minds within a 140-character limit. As another example, Facebook provides a "Live Feed" where users' activities are streamed as soon as it happens.

Cloud computing may optionally be merged with the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention. Instead of connecting users based solely on social interest, the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention may be designed to develop interactive communities that connect individuals based on shared needs or experiences. This concept could be designed to provide specialized networking tools and applications that can be accessed via the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention website.

One use for the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention is between businesses. Companies can use the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention to build their brand image. The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention can be used by businesses to create brand awareness, as an online reputation management tool, for recruiting, to learn about new technologies and competitors, and as a lead generation tool to intercept potential prospects. Companies can use the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention to to drive traffic to their own online sites while encouraging their consumers and clients to have discussions on how to improve or change products or services.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present inventions can operate under an autonomous business model, in which a Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention's members serve dual roles as both the suppliers and the consumers of content. This is in contrast to a traditional business model, where the suppliers and consumers are distinct agents. Revenue is typically gained in the autonomous business model via advertisements, but subscription-based revenue is possible when membership and content levels are sufficiently high.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention can be designed to be extended toward businesses to created, and re-enforce brand networking. A brand running on the Coupon Exchange, in which the coupon may be hard copy or soft copy, which includes a uniquely identified bar code or other uniquely identified machine readable code, or which may be configured as a structured or semi-structured electronic message, social network app 130 can be used to build consumer relationships by connecting their consumers to the brand image on this platform that provides them relative content, elements of participation, and a ranking, or score system. Brand networking is a way to capitalize on social trends as a marketing tool within the Coupon Exchange, in which the coupon may be hard copy or soft copy, which includes a uniquely identified bar code or other uniquely identified machine readable code, or which may be configured as a structured or semi-structured electronic message, social network Web App 130.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention can be designed to provide an online environment for people to communicate and exchange personal information for dating purposes.

The Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention is a new virtual currency that can be used create new opportunities for global finance. In the present invention, the currency of Coupons, which may be hard copy or soft copy, which includes a uniquely identified bar code or other uniquely identified machine readable code, or which may be configured as a structured or semi-structured electronic message, will naturally exchange at their bonafide value, not an artificial value. If the Coupons, which may be hard copy or soft copy, which includes a uniquely identified bar code or other uniquely identified machine readable code, or which may be configured as a structured or semi-structured electronic message, generated by the present invention are valued at a percentage of cost of an item vs. a monetary amount, they can be used against for a purchase, inflation and deflation are mitigated, and become a more universal form of currency that doesn't rise and fall with local economies within the world, and the declining shelf life value of goods can potentially be mitigated as well.

There are a number of projects that aim to develop free and open source software that can be used to build the Coupon Exchange, in which the coupon may be hard copy or soft copy, which includes a uniquely identified bar code or other uniquely identified machine readable code, or which may be configured as a structured or semi-structured electronic message, social network Web App 130 feature of the present invention services. The projects include, but are not limited to, Anahita, Diaspora, Appleseed Project, OneSocialWeb, and StatusNet. These technologies are often referred to as social engine or social network engine software. In addition, the Coupon Exchange, in which the coupon may be hard copy or soft copy, which includes a uniquely identified bar code or other uniquely identified machine readable code, or which may be configured as a structured or semi-structured electronic message, can be used to facilitate the exchange of coupons, which may be hard copy or soft copy, which includes a uniquely identified bar code or other uniquely identified machine readable code, or which may be configured as a structured or semi-structured electronic message, from other coupon sites, such as, but not limited to, Groupon, Living Social, Coupon Cabin, etc.

The present invention's database(s), and Web Apps 130 are accessible via the Internet Cloud 120. The present invention's database server(s) can be a collection of one or more servers, computers, etc. that are able to provide functionality for the present invention. The present invention's servers can include multiple similar and distinct hardware components or models, such as but not limited to Dell, IBM, Sun, HP and required operating system software such as but not limited to UNIX, Microsoft Windows, Redhat Linux and other required supportive operating systems. In addition, servers can include a multitude of supporting software components required to support the implementation of the present invention including, but not limited to Apache Web Server software, Microsoft IIS Web Server Software, Oracle, MySQL, Lightweight Directory Access Protocol (LDAP), Domain Name System (DNS) and HyperText Transfer Protocol (HTTP), Voice recognition software, Voice application engines, Application engines, and CORBA software and middle-ware The present invention's database(s) represents the storage of data including software required to run servers and provide functionality for the present invention. The present invention's database(s) can be attached to server via network transport or bus connections including, but not limited to Small Computer Systems Interface (SCSI), Internet SCSI (iSCSI), Peripheral Component Interconnect (PCI), Fiber optic transport, Fiber Channel, TCP/IP, and SNA. In addition, the present invention's database(s) can be a collection of one or more media storage units that are located locally or remotely to servers. the present invention's database(s) can be built on storage such as, but not limited to, magnetic and optical media. These systems and associated software may be housed in an Internet Data Center equipped with fully redundant subsystems, such as multiple fiber trunks coming from multiple sources, redundant power supplies, and backup power generators. the present invention's database(s) may also utilize firewall technology to securely protect the information stored in the present invention's database(s). In addition, the present invention's database(s) may provide secure access through the use of passwords, Personal Identification Numbers (PIN), and/or biometric identification.

A member, or business member may be connected to the present invention's database(s) via access networks. Access networks (not shown) may be configured as Cable TV, PSTN, etc. and can be used for accessing information stored in the present invention's database(s), and for messaging members, or business members connected via an access network to the Internet cloud. one of these types of networks. A member, or business member may use a wide variety of devices to access the present invention's database (s), such as, but not limited to, intelligent building interfaces, PCs, TVs, set-tops boxes, Internet appliances, e-mail stations, telephones, cellphones, tablets, laptops, etc. The aforementioned devices (not shown) are usually connected to an access network via a router (not shown), or switch (not shown).

At a minimum, access networks are typically configured with a multiplexer (not shown) and line interface device (not shown). The line interface device may be configured as a stand-alone modem, a PCMCIA card, as a wireless POP, or integrated into various devices, including, but not limited to PCs, cellphones, set-top boxes, tablets, laptops, etc.

The multiplexer may be located at the Central Office, or Digital Loop Carrier of a telephony network, or the Head-End, or intermediate node of a Cable TV network, or at a third-party Application Server Provider's office, or the network center of an auction house, etc. The multiplexer is capable of receiving analog and digital signals including, but not limited to, Internet Cloud 120 traffic including e-mail from e-mail servers (not shown) and data from servers, and voice feed from the PSTN, etc. The multiplexed signal may be transmitted over a variety of transmission medium, including but not limited to, C, etc.

Communication Links 170A, B, C, D 190A, B, C, D can be hard-wired and/or wireless technologies. Communication Links 170A, B, C, D 190A, B, C, D are the means of connecting one location to another for the purpose of transmitting and receiving analog or digital information. As an example, these communication links can be used by the consumer using their cell phone to scan a bar code on a hard copy advertisement that has been delivered for free, in order to link back up to the Internet. There are at least three types of basic data-link configurations that can be conceived of and used:

1) Simplex communications, most commonly meaning all communications in one direction only.
2) Half-duplex communications, meaning communications in both directions, but not both ways simultaneously.
3) Duplex communications, communications in both directions simultaneously.

Example of the Present Invention In Which A Business Provides Free Delivery In Which A Hard Copy Coupon Includes A Uniquely Identified Bar Code, Which Can Be Offered For Exchange On The Present Invention'S Coupon Exchange Web App 130—In this example, Consumer 100 (Joe) is at home, and the business providing Free Delivery of advertising and marketing materials is a pizza delivery business (Dominos). Joe picks up the phone and dials his local Dominos. He orders a pepperoni pizza, light on the sauce, extra pepperoni, and a 2 liter bottle of root beer. Alternatively, Joe can order a pepperoni pizza, light on the sauce, extra pepperoni, and a 2 liter bottle of root beer on-line.

A person, or perhaps machine, at Dominos enters the order, and in order to complete delivery of the pizza they take Joe's phone number and street address. Since Dominos is a subscriber to the present invention in this example, their computer system connects to the present invention's Web App 130, which runs a software application that can analyze and use all the information gathered during Joe's order to generate soft-copy advertising specifically for Joe based on his pizza preference, phone number, address, frequency of the number of times Joe orders pizza, the time of day, the time of year, etc.

Advertising and marketing methods that may be employed in this example include, but are not limited to, cross-branding, ambush marketing, article marketing, article video marketing, digital market, direct marketing, diversity marketing, mega-marketing, multi-level marketing, cause marketing, close range marketing, cloud marketing, communal marketing, consumer-generated marketing, cross-media marketing, customer advocacy marketing, database marketing, ethical marketing, evangelism marketing, figure of merit marketing, global marketing, guerrilla marketing, inbound marketing, influencer marketing, Internet marketing, nano-campaign marketing, next best action marketing, permission marketing, proximity marketing, reality marketing, relationship marketing, shopper marketing, undercover marketing, loyalty marketing, etc, can be used by businesses that choose to use the Free Delivery and Web App 130 described in the present invention.

The present invention's applications generate customer specific soft copy advertising and marketing materials for customer Joe is transmitted to a Local Printer 111 at the Dominos. The pizza is prepared, cooked, and boxed. A Dominos worker matches the hard copy with soft copy links, such as a uniquely identified bar code or other uniquely identified machine readable code, which can be used by Consumer 100 Joe to access electronic documents displayed on cellphones, PCs, net books, notebooks, laptops, tablets, e Readers, etc, advertising for Joe, and slaps it on the outside, or inside White Space of the pizza delivery box.

A Dominos worker delivers the pizza to Joe, along with hard copy with soft copy links, such as a bar code or other machine readable code, is used to access electronic documents displayed on cellphones, PCs, net books, notebooks, laptops, tablets, e Readers, etc, advertising. Therefore, the delivery of the hard copy with soft copy links, such as a bar code or other machine readable code, is used to access electronic documents displayed on cellphones, PCs, net books, notebooks, laptops, tablets, e Readers, etc, advertising is free.

Joe is watching a football game with his buddies, the pizza box goes on the coffee table, the pizza is eaten, and during the time the pizza box White Space advertising can be seen by Joe and his buddies. Joe's box includes hard copy advertising that includes uniquely identified bar codes that can be used to redeem one of the present invention's coupons at a business, or as a link to the business's website, or to capture as a Mobile Coupon that can be redeemed at a business. On Joe's pizza box there is a discount coupon for a local grocery store, gas station, movie rental, yard clean-up special, snow removal, and house painting.

The advertisers can be local, regional, national, or international. In order to advertise in conjunction with the present invention, a business goes to the Web App 130, creates an account, and creates a Free Delivery advertising campaign. Joe can subscribe to the present invention's Web App 130 as well, and provide more specific demographics, and filters about his likes and dislikes in order for advertisers to more directly target advertising specifically for Joe, and to participate in the Coupon Exchange. A national advertiser may choose to take out ½ page ads at a premium for every address in a specific zip code, for a period of three weeks. Alternatively, a local house painter may choose ten word ads in a small box that are printed for a specific zip code, but only when space is available, in order to control his advertising budget.

After the football game, Joe decides to retain the discount coupons for a local grocery store, gas station, movie rental, yard clean-up special, snow removal, but to go to the present invention's Coupon Exchange running on Web App 130 to offer his uniquely identified coupon for exchange with other registered users of the present invention. The uniquely identified house painting coupon is worth five hindered real world dollars if used in the next week. Perhaps Joe will be able to trade his house painting coupon for uniquely identified coupons for discounts on ten cases of his favorite beer on the present invention's Coupon Exchange operating on Web App 130.

One skilled in the art will instantly recognize that this example is representative of many different applications for real world marketing and advertising methods that are agile, can employ virtually any marketing and advertising method, uses on-demand printing, and existing methods of Free Delivery of real world objects as a means of Free Delivery of advertising and marketing materials to a consumer.

Having thus described a preferred embodiment and other embodiments of a system, method, and apparatus for many different applications for real world marketing and advertising methods that are agile, can employ virtually any marketing and advertising method, uses on-demand printing, and existing methods of Free Delivery of real world objects as a means of Free Delivery of advertising and marketing materials to a consumer, and it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

What is claimed is:

1. A method comprising:
   providing a software application for posting available hard copy space for advertisements for sale, wherein the hard copy space is not associated with the organization making the hard copy space available, and furthermore wherein the advertisement is uniquely identified;
   printing on demand a hard copy advertising document to a first consumer with content specifically for the first consumer based on information from the first consumer collected during an ordering process, the information comprising preferences of the first consumer and address of the first consumer;

and delivering a hard copy advertising document to a first consumer, wherein the hard copy advertisement can be acted on by the first consumer for their benefit from the list consisting of: reduced cost goods, reduced cost services, free goods, and free services or conveyed to another;

wherein the hard copy advertising document includes a machine readable code to facilitate redemption, wherein the machine readable code includes a unique identifier for the hard copy advertising document to facilitate transferring benefit of the hard copy advertisement to another and to limit redemption to a single use;

reading the machine readable code from the hard copy advertising document using a device; and electronically transferring within an electronic message benefit of the hard copy advertising document from the first consumer to a second consumer using the unique identifier for the hard copy advertising document such that the hard copy can be acted on by the second consumer for their benefit from the list consisting of: reduced cost goods, reduced cost services, free goods, and free services;

wherein the hard copy advertising document is printed on a physical item selected from the list consisting of: a coffee cup, a coffee cup holder, a straw wrapper, a napkin, a restaurant menu, a bottle, and a box.

2. The method of claim 1 wherein the device is from the list consisting of: a cellphone, a smartphone, a tablet, a laptop, a netbook, and a PC.

3. The method of claim 1 wherein the electronic message using XML.

4. The method of claim 1 wherein the hard copy advertisements are sold with geographic limitations and date limitations.

5. The method of claim 1 wherein the ordering process is an ordering process for food items to be delivered to the address.

6. A method comprising:

printing on demand a uniquely identified hard copy advertisement with content specific to a first consumer based on information from the first consumer collected during an ordering process, the information comprising preferences of the first consumer and address of the first consumer;

delivering the uniquely identified hard copy advertising document to the first consumer, wherein the hard copy advertisement can be acted on the first consumer for their benefit from the list consisting of: reduced cost goods, reduced cost services, free goods, and free services or conveyed to another;

wherein the uniquely identified hard copy advertising document includes a machine readable code to facilitate redemption, wherein the machine readable code includes a unique identifier for the hard copy advertising document to facilitate transferring benefit of the hard copy advertisement to another to limit redemption to a single use; and electronically transferring within an electronic message benefit of the hard copy advertising document from the first consumer to a second consumer using the unique identifier for the hard copy advertising document such that the hard copy can be acted on by the second consumer for their benefit from the list consisting of: reduced cost goods, reduced cost services, free goods, and free services;

wherein the hard copy advertising document comprises a fantasy league sports token.

7. The method of claim 6 wherein the ordering process is an ordering process for food items to be delivered to the address.

* * * * *